US006961466B2

(12) United States Patent
Imagawa et al.

(10) Patent No.: US 6,961,466 B2
(45) Date of Patent: Nov. 1, 2005

(54) METHOD AND APPARATUS FOR OBJECT RECOGNITION

(75) Inventors: Taro Imagawa, Osaka (JP); Tsuyoshi Mekata, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 676 days.

(21) Appl. No.: 10/001,613

(22) Filed: Oct. 31, 2001

(65) Prior Publication Data

US 2002/0051578 A1 May 2, 2002

(30) Foreign Application Priority Data

Oct. 31, 2000 (JP) ....................................... 2000-332004

(51) Int. Cl.$^7$ ............................. G06K 9/46; G06K 9/62

(52) U.S. Cl. ....................................... 382/190; 382/224

(58) Field of Search ................................ 382/118, 190, 382/191, 224, 225

(56) References Cited

U.S. PATENT DOCUMENTS 5,850,470 A * 12/1998 Kung et al. ................. 382/157
6,647,139 B1 * 11/2003 Kunii et al. ................ 382/159
2002/0136435 A1 * 9/2002 Prokoski ...................... 382/118

FOREIGN PATENT DOCUMENTS

JP 64-050178 2/1989

OTHER PUBLICATIONS

Gonzalez. Digital Image Processing. Addison–Wesley, Mar. 24, 1992, pp. 580–583.*

Liu et al. "Distinguishing Point Targets from Decoys by Fusing Thermal and Visual Images." Proc. IEEE 1991 National Aerospace and Electronics Conf., vol. 1, May 20, 1991, pp. 349–352.*

Clark et al. "Detecting Buried Objects by Fusing Dual–Band Infrared Images." Conf. Record of the 27$^{th}$ Asilomar Conf. on Signals, Systems and Computers, vol. 1, Nov. 1, 1993, pp. 135–143.*

Wilder et al. "Comparison of Visible and Infra–Red Imagery for Face Recognition." Proc. 2$^{nd}$ Int. Conf. on Automatic Face and Gesture Recognition, Oct. 14, 1996, pp. 182–187.*

* cited by examiner

*Primary Examiner*—Jon Chang
(74) *Attorney, Agent, or Firm*—Snell & Wilmer L.L.P.

(57) ABSTRACT

An object recognition apparatus includes an input section for inputting a first image set including a predetermined number of images including a first image representing a first target object using a first attribute and a second image representing the first target object using a second attribute different from the first attribute, a feature vector calculation section for calculating a first feature vector in a feature space having at least one filter output value as a vector component, the at least one filter output value being obtained by applying at least one predetermined image filter to at least one predetermined position in the predetermined number of images in the first image set, and a judgment section for judging whether or not the first target object is categorized into a specific category based on a relationship between the first feature vector and predetermined discriminant parameters.

11 Claims, 23 Drawing Sheets

$$\text{Filter output value} = (-1)\cdot 0 + (-1)\cdot 0 + (-1)\cdot 0 + 0\cdot 255 + 0\cdot 255 + 0\cdot 255 + 1\cdot 255 + 1\cdot 255 + 1\cdot 255 = 765$$

METHOD AND APPARATUS FOR OBJECT RECOGNITION

BACKGROUND OF THE INVENTION

1. Field of the Invention

The present invention relates to an apparatus and method for recognizing an object belonging to a specific category. More particularly, the present invention relates to an apparatus and method for recognizing an object using a plurality of images representing the object in terms of different attributes.

2. Description of the Related Art

Japanese Laid-Open Publication No. 8-287216, entitled "Internal facial feature recognition method", discloses a technique for recognizing a target object in a plurality of images representing the target object in terms of different attributes. In this conventional technique, internal facial features (e.g., the mouth) are recognized from a far-infrared light (light having a wavelength of 8 to 10 $\mu$m) image and a visible light image (from a plurality of images representing a target object in terms of different attributes). A far-infrared light image represents the intensity of far-infrared light emitted from a target object. Since the intensity of far-infrared light emitted from a target object can correspond to the temperature of a target object, a region having a specific temperature (e.g., about 36° C. which is the typical skin temperature of a human) can be extracted from an far-infrared light image.

Use of only a temperature image often encounters difficulties in detection of a target object. For example, when detecting a human (a target object), if there are other objects (e.g., an electric appliance in a room) having substantially the same temperature as that of a human in the vicinity of the human, it is difficult to detect the human accurately. To avoid this, a region having a skin color in a visible light image is referenced so as to improve the detection of a human.

In a conventional technique as described in the aforementioned publication, in order to locate a feature to be recognized, a matching needs to be established between a skin temperature region extracted from a far-infrared light image and a skin color region extracted from a visible light image. To establish such a matching, the following procedures have to be performed in advance: (i) a skin temperature region (a region having a temperature of about 36° C.) is accurately extracted from a far-infrared light image, and a skin color region is accurately extracted from a visible light image, and (2) a matching is established between pixels in the far-infrared light image and the visible light image.

The matching between the far-infrared light image and the visible light image requires accurate alignment of optical axes of a visible light camera and a far-infrared light camera, leading to a problem that the structure of an image capturing system and the initial settings for object recognition become complicated.

In order to accurately extract a skin temperature region from a far-infrared light image, calibration has to be frequently performed so as to compensate for an influence of the temperature of the optical system, circuits, and elements of a far-infrared light camera which changes over time. Alternatively, an entire far-infrared light camera may be held at a constant temperature so as to eliminate an influence of the temperature of the optical system, circuits, and elements of the far-infrared light camera (e.g., the camera is cooled). Unfortunately, as a result, the settings and maintenance of a recognition system comprising a far-infrared light camera become complicated, leading to an increase in cost.

In addition, skin temperature varies significantly depending on an influence of sunlight or ambient temperature. Especially in the outdoors, skin temperature is likely to be deviated far from a standard temperature of 36° C. due to variations in conditions, such as sunlight and ambient temperature. Skin temperature also varies depending on time slots in a day. If skin temperature varies in this manner, it becomes difficult to accurately detect a skin temperature region from a far-infrared light image. In order to accurately extract a skin temperature region under varying environmental conditions, a different extraction algorithm has to be prepared for each set of environmental conditions, which makes it difficult to provide the initial settings of the recognition system.

A visible light image also has difficulties in the accurate detection of the color of a target object in an environment, such as the outdoors, in which a camera is easily affected by sunlight, a headlight of a car, or the like. This is because the limit of the dynamic range of a camera or the spectral distribution of a light source cannot be fixed. In order to accurately extract a skin color region under varying environmental conditions, a different extraction algorithm has to be prepared for each set of environmental conditions, which makes it difficult to provide the initial settings of the recognition system.

Moreover, the extraction of a skin temperature region from a far-infrared light image and the extraction of a skin color region from a visible light image are processes specific to the attributes of an individual target object. Such processes do not work when a target object is changed. For example, a region extraction algorithm has to be newly prepared when the above-described conventional technique is applied to the recognition of an animal. Therefore, an extraction algorithm has to be prepared for each object to be recognized, which makes it difficult to provide the initial settings of a recognition system.

As described above, according to the conventional technique, the requirement of establishing the matching between a region in a far-infrared light image and a region in a visible light image is attributed to the problem that it is practically difficult to provide the settings of recognition of a target object and the recognition system is easily affected by environmental conditions.

SUMMARY OF THE INVENTION

According to an aspect of the present invention, an object recognition apparatus comprises an input section for inputting a first image set including a predetermined number of images including a first image representing a first target object using a first attribute and a second image representing the first target object using a second attribute different from the first attribute, in which the predetermined number is two or more, a feature vector calculation section for calculating a first feature vector in a feature space having at least one filter output value as a vector component, the at least one filter output value being obtained by applying at least one predetermined image filter to at least one predetermined position in the predetermined number of images in the first image set, and a judgment section for judging whether or not the first target object is categorized into a specific category based on a relationship between the first feature vector and predetermined discriminant parameters.

In one embodiment of this invention, the input section further inputs a plurality of image sets each including the images of the predetermined number, the plurality of image sets including at least one second image set and at least one third image set other than the at least one second image set, each image of the at least one second image set including a third image representing a second target object belonging to the specific category using the first attribute and a fourth image representing the second target object using the second attribute, the feature vector calculation section further calculates a feature vector in a feature space having at least one filter output value as a vector component, the at least one filter output value being obtained by applying at least one predetermined image filter to at least one predetermined position in the predetermined number of images in the said input plurality of image sets, and the object recognition apparatus further includes a learning section for calculating the discriminant parameters so as to discriminate at least one feature vector in the feature space for the at least one second image set from at least one feature vector in the feature space for the at least one third image set.

In one embodiment of this invention, the learning section defines the feature space by removing at least one dimension from a temporary feature space having a higher number of dimensions than the feature space based on a direction of a normal to a plane for discriminating the at least one feature vector for the at least one second image set from the at least one feature vector for the at least one third image set.

In one embodiment of this invention, the discriminant parameters represent a discriminant surface in the feature space, and the judgment section judges whether or not the first target object is categorized into the specific category based on which side of the discriminant surface the first feature vector is present.

In one embodiment of this invention, the judgment section judges that the first target object is categorized into the specific category when a distance between the first feature vector and the discriminant surface is greater than or equal to a predetermined threshold.

In one embodiment of this invention, the at least one predetermined image filter has directional selectivity, positional selectivity, and spatial frequency selectivity.

In one embodiment of this invention, the first image represents an intensity of light having a first wavelength band emitted or reflected by the first target object, and the second image represents an intensity of light having a second wavelength band different from the first wavelength band emitted or reflected by the first target object.

In one embodiment of this invention, the input section further inputs a fifth image representing the first target object using the first attribute and a sixth image representing the first target object using the second attribute, and the input section is configured so that the first image and the second image are captured at a first time, and the fifth image and the sixth image are captured a predetermined time after the first time.

In one embodiment of this invention, the input section is configured so that the first image is captured at a first site, and the second image is captured at a second site different from the first site.

In one embodiment of this invention, the input section further inputs a fifth image representing the first target object using the first attribute and a sixth image representing the first target object using the second attribute, and the input section is configured so that the first and second images are captured at a first site, and the fifth and sixth images are captured at a second site different from the first site.

According to another aspect of the present invention, an object recognition method comprises the steps of (a) inputting a first image set including a predetermined number of images including a first image representing a first target object using a first attribute and a second image representing the first target object using a second attribute different from the first attribute, in which the predetermined number is two or more, (b) calculating a first feature vector in a feature space having at least one filter output value as a vector component, the at least one filter output value being obtained by applying at least one predetermined image filter to at least one predetermined position in the predetermined number of images in the first image set, and (c) judging whether or not the first target object is categorized into a specific category based on a relationship between the first feature vector and predetermined discriminant parameters.

According to another aspect of the present invention, a program for causing a computer to perform an object recognition process is provided. The process comprises the steps of (a) inputting a first image set including a predetermined number of images including a first image representing a first target object using a first attribute and a second image representing the first target object using a second attribute different from the first attribute, in which the predetermined number is two or more, (b) calculating a first feature vector in a feature space having at least one filter output value as a vector component, the at least one filter output value being obtained by applying at least one predetermined image filter to at least one predetermined position in the predetermined number of images in the first image set, and (c) judging whether or not the first target object is categorized into a specific category based on a relationship between the first feature vector and predetermined discriminant parameters.

According to another aspect of the present invention, a computer-readable recording medium storing a program for causing a computer to perform an object recognition process is provided. The process comprises the steps of (a) inputting a first image set including a predetermined number of images including a first image representing a first target object using a first attribute and a second image representing the first target object using a second attribute different from the first attribute, in which the predetermined number is two or more, (b) calculating a first feature vector in a feature space having at least one filter output value as a vector component, the at least one filter output value being obtained by applying at least one predetermined image filter to at least one predetermined position in the predetermined number of images in the first image set, and (c) judging whether or not the first target object is categorized into a specific category based on a relationship between the first feature vector and predetermined discriminant parameters.

According to the present invention, an input image set to be recognized (first image set) includes a first image representing a target object (first target object) using a first attribute, and a second image representing the target object using a second attribute different from the first attribute. Whether or not the target object is categorized into a specific category is judged based on the first and second attributes, thereby improving the reliability of the recognition of the target object. Further, a predetermined image filter is applied to a predetermined position of a predetermined number of images to obtain a feature, which is used as a component to obtain a feature vector in a feature space. The image set is thus represented by the feature vector. Such a process does not require the matching of a region of the first image and a region of the second image, whereby it is not difficult to provide the settings for the recognition of the target object, and a result of the recognition is not easily affected by an environmental condition.

Thus, the invention described herein makes possible the advantages of providing: an object recognition apparatus which has a high level of recognition reliability, requires settings which are easily provided, and is not easily affected by environmental conditions; an object recognition method; a program for causing a computer to perform the object recognition method; and a recording medium storing the program.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

Firstly, the principle of the present invention will be described below with reference to FIGS. 1 through 5.

Figure 1:
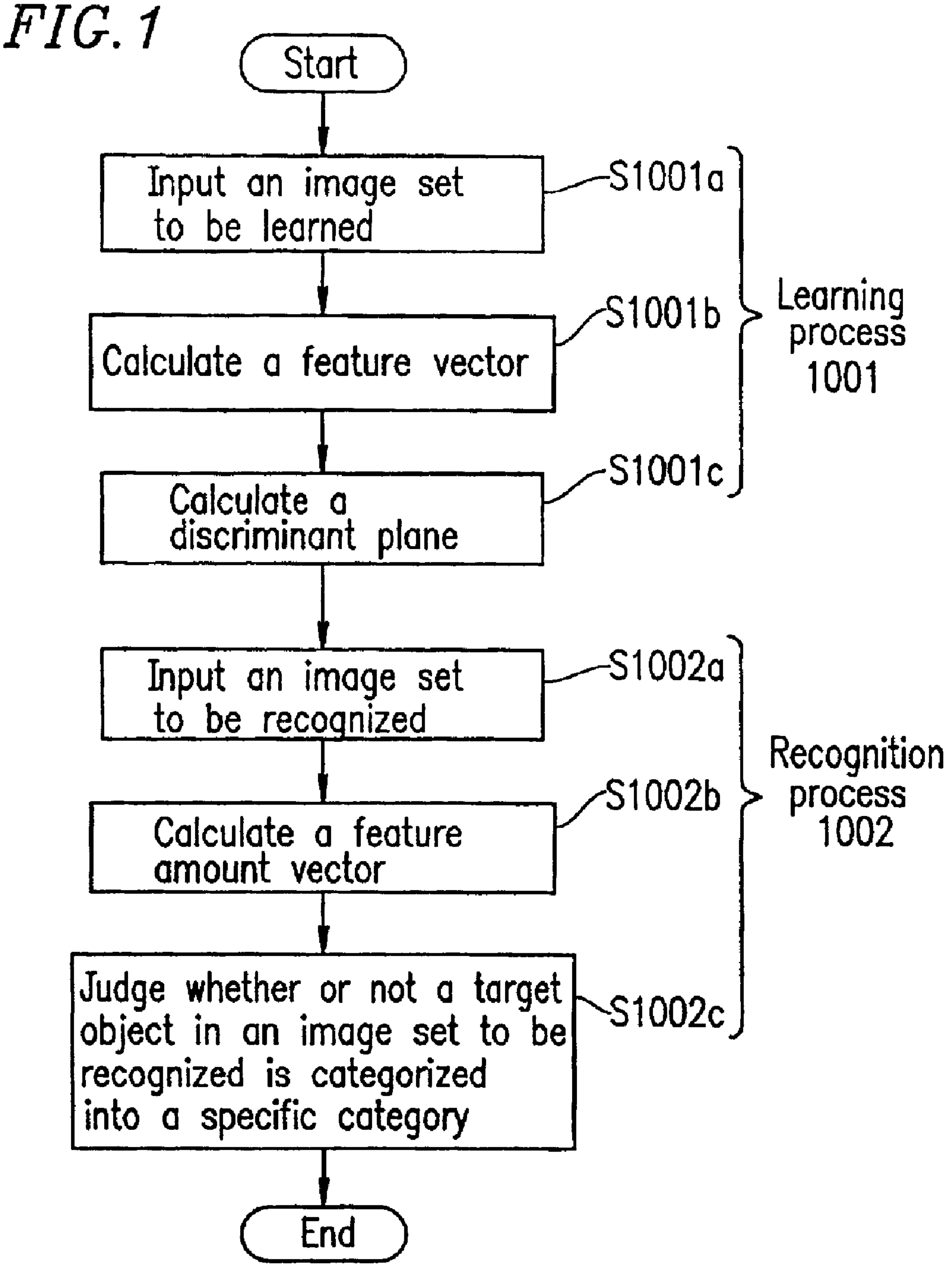
FIG. 1 is a flowchart showing a procedure of an object recognition method according to the present invention.

FIG. 1 is a flowchart showing a procedure of an object recognition method according to the present invention. The object recognition method of the present invention comprises a learning process 1001 (steps S1001*a* to S1001*c*) and a recognition process 1002 (steps S1002*a* to S1002*c*). Hereinafter, the object recognition method of the present invention is applied to recognition of a human, for example. The procedure of the object recognition method of the present invention will be described. The object recognition method shown in FIG. 1 is executed by an object recognition apparatus 1 which is described later with reference to FIG. 6.

In step S1001*a*, sets of images to be learned are input to the object recognition apparatus 1. Unless otherwise specified, the term "a set of images" as used herein refers to two images (a visible light image and a far-infrared light image) of the same target object. The term "a set of images to be learned" as used herein includes at least a set of images (a second image set) representing a human (a second target object belonging to a category "human"), and at least an image set other than the second image set (a third image set representing a target object other than a human). In step S1001*a*, a plurality of image sets to be learned are input to the object recognition apparatus 1.

In step S1001*b*, a feature vector is calculated for each image set to be learned input in step S1001*a*. The calculation of a feature vector of one image set will be described later with reference to FIGS. 2A and 2B. A feature vector may be regarded as a point in a feature space.

In step S1001*c*, a discriminant plane in the feature space, which discriminates the feature vector of at least one second image set from the feature vector of at least one third image set, is calculated. The calculation of the discriminant plane will be described later with reference to FIG. 4.

In step S1002*a*, an image set to be recognized (first image set) is input to the object recognition apparatus 1.

In step S1002*b*, the feature vector of each of the image sets to be recognized, which has been input in step S1002*a*, is calculated.

In step S1002*c*, whether or not a target object (first target object) in the image sets to be recognized is categorized into the specific category "human" is judged. This judgment is performed based on a positional relationship of the feature vector obtained in step S1002*b* and the discriminant plane obtained in step S1001*c*.

The learning process 1001 is a process for calculating a discriminant plane (discriminant parameters) using image sets to be learned. This discriminant plane is used in the recognition process 1002 as a criterion on which whether or not a target object represented in an image set to be recognized is categorized into a specific category is judged.

Figure 2A:
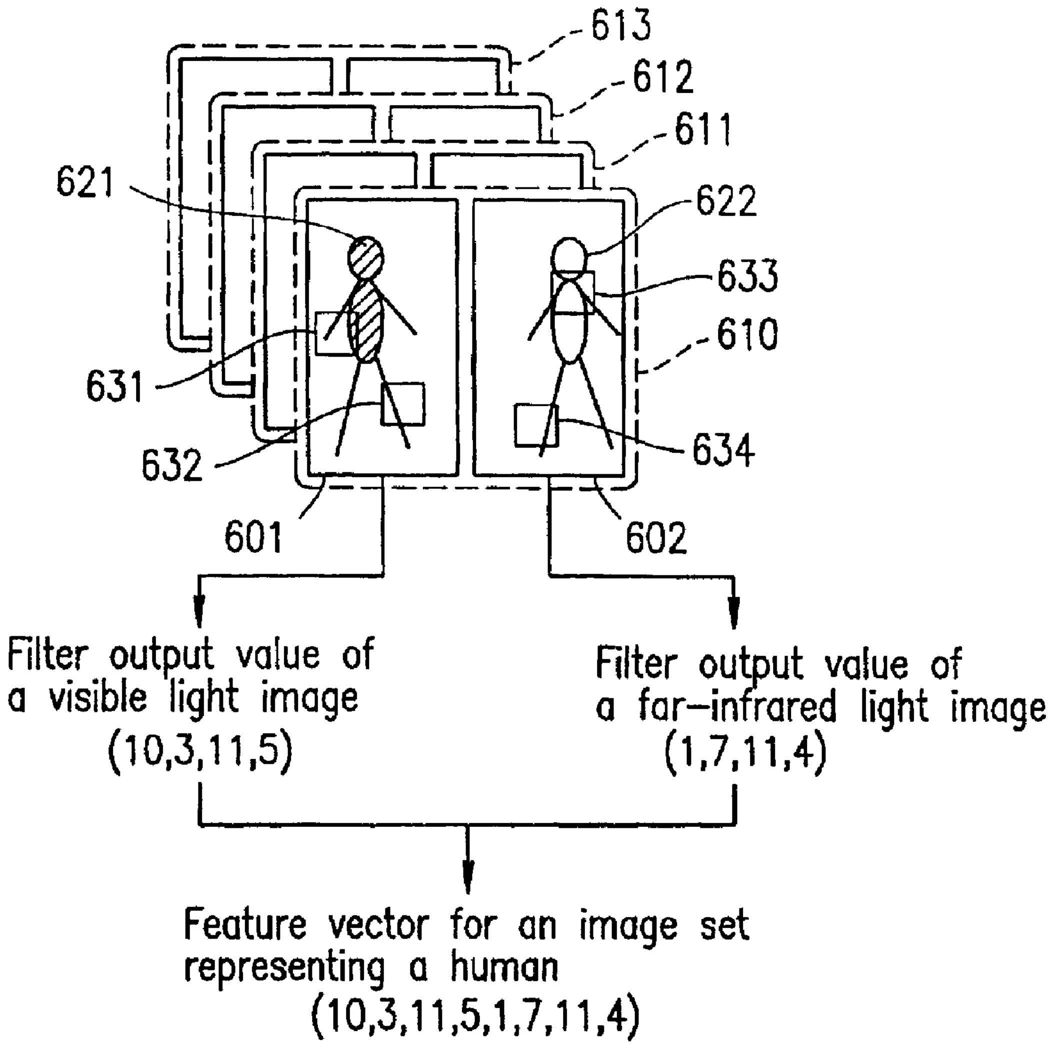
FIG. 2A is a diagram showing image sets 610 to 613 (at least one second image set) input in step S1001*a* (FIG. 1).

FIG. 2A is a diagram showing image sets 610 to 613 (at least one second image set) input in step S1001*a* (FIG. 1). Each of the image sets 610 to 613 includes two images, i.e., a visible light image of a human and a far-infrared light image of the same human. In the example shown in FIG. 2A, the image set 610 includes a visible light image 601 (third image) and a far-infrared light image 602 (fourth image). Note that the term "visible light image" refers to the intensity of visible light (having a wavelength band of 380 to 800 nm) emitted or reflected by a target object in an image, and the term "far-infrared light image" refers to the intensity of far-infrared light (having a wavelength band of 8 to 10 $\mu$m) emitted or reflected by a target object in an image. In other words, a visible light image represents a target object using the intensity (luminance) of visible light emitted or reflected by the target object, which is an attribute of the target object. A far-infrared light image represents a target object using the intensity (luminance) of far-infrared light emitted or reflected by the target object, which is another attribute of the target object.

A target object 621 in the image 601 and a target object 622 in the image 602 are the same target object (the same human). A target object in the visible light image and far-infrared light image of the image set 611 are the same target object. However, the image sets 610 and 611 may not necessarily have the same target object. The target objects in the image sets 610 and 611 have to be categorized into the same category (in this example, the category is "human").

Although FIG. 2A shows four second image sets (image sets 610 to 613) input in step S1001*a* (FIG. 1), the number of second image sets input in step S1001*a* (FIG. 1) is not limited to this.

Figure 2B:
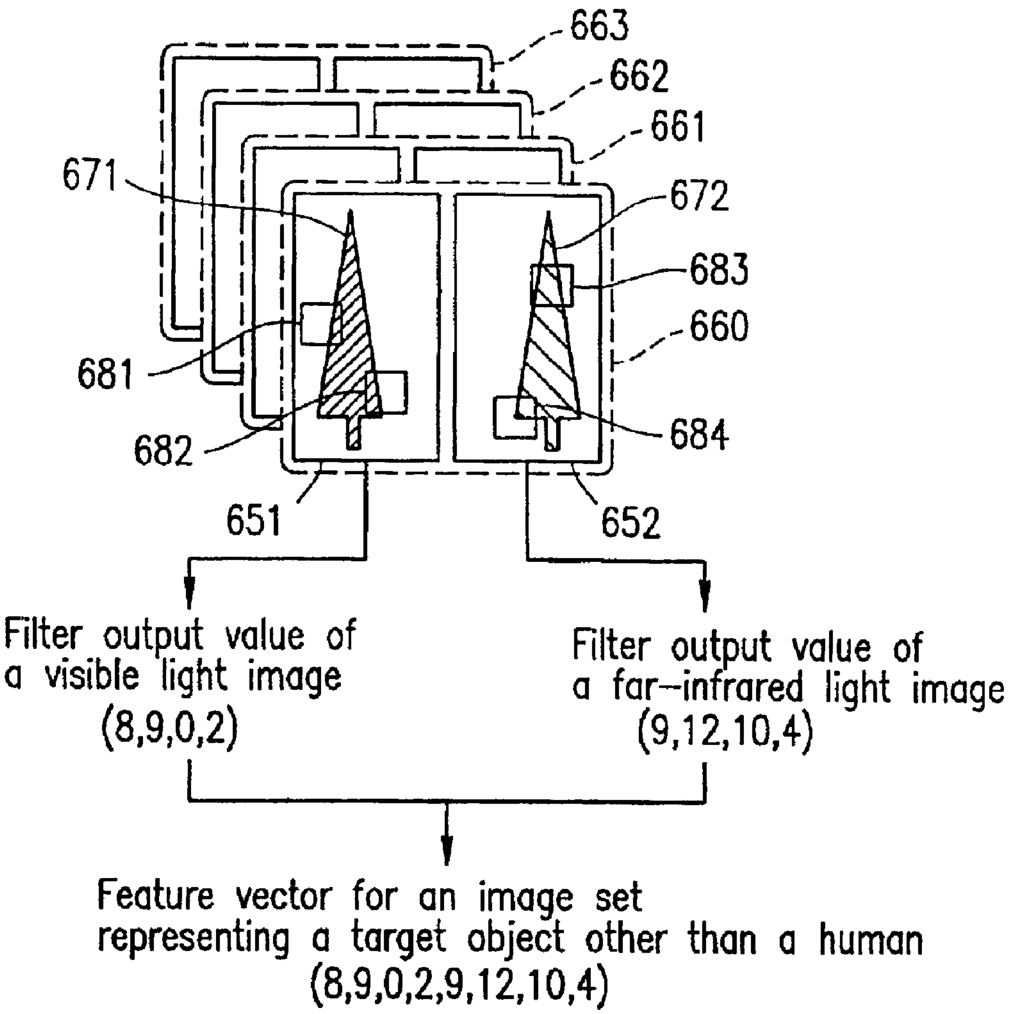
FIG. 2B is a diagram showing image sets 660 to 663 (at least one third image set) input in step S1001*a* (FIG. 1).

FIG. 2B is a diagram showing image sets 660 to 663 (at least one third image set) input in step S1001*a* (FIG. 1). Each of the image sets 660 to 663 includes two images, i.e., a visible light image of a target object other than a human, and a far-infrared light image of the same target object. In the example shown in FIG. 2B, the image set 660 includes an image 651 (visible light image) and another image 652

(far-infrared light image). The image 651 has the same size as that of the image 601 (FIG. 2A). The image 652 has the same size as that of the image 602 (FIG. 2A).

Referring to FIG. 2A again, in step S1001*b* (FIG. 1), a feature vector of an image set will be described.

It is now assumed that two types of image filters (image filters A and B, not shown) are applied to two positions 631 and 632 in the image 601. The image filters A and B may have different characteristics. A specific example of an image filter will be described later with reference to FIG. 3. In FIG. 2A, the positions 631 and 632 are indicated by rectangles. The rectangles represent the sizes of the image filters A and B. It is here assumed that the image filters A and B have the same size.

One image filter is applied to one position of the image 601 to produce one scalar value (filter output value). In the example of FIG. 2A, the image filters A and B are applied to the positions 631 and 632 of the image 601 to produce four respective filter output values (10, 3, 11, and 5). Specifically, the image filter A is applied to the positions 631 and 632 to produce the respective filter output values "10" and "3". The image filter B is applied to the positions 631 and 632 to produce the respective filter output values "11" and "5".

Similarly, the image filters A and B are applied to two positions 633 and 634 of the image 602 to produce four respective filter output values (1, 7, 11, and 4).

The four filter output values (10, 3, 11, and 5) obtained in the image 601 and the four filter output values (1, 7, 11, and 4) obtained in the image 602 are combined to produce a feature vector (10, 3, 11, 5, 1, 7, 11, 4) of the image set 610. Thus, information on a visible light image and information on a far-infrared light image are integrated using a filter output value.

Similarly, the feature vectors of the image sets 611 to 613 shown in FIG. 2A are calculated. These feature vectors have filter output values as components. Each feature vector may be regarded as a point in an eight-dimensional feature space.

Similarly, the feature vector of the image set 660 shown in FIG. 2B is calculated. Specifically, the image filters A and B are applied to two positions 681 and 682 of the image 651 to produce four filter output values (8, 9, 0 and 2). The image filters A and B are applied to the two positions 683 and 684 in the image 652 to produce four filter output values (9, 12, 10 and 4). The four filter output values (8, 9, 0 and 2) obtained in the image 651 and the four filter output values (9, 12, 10 and 4) obtained in the image 652 are combined to produce the feature vector (8, 9, 0, 2, 9, 12, 10, 4) of the image set 660. Similarly, the feature vectors of the image sets 661 to 663 shown in FIG. 2B are calculated.

An applied image filter and a position(s) to which the image filter is applied are predetermined. In an example according to the present invention, an applied image filter and a position(s) to which the image filter is applied are determined through a process for deleting the dimensions of a feature, which will be described later with reference to FIG. 12. In the example shown in FIGS. 2A and 2B, the same image filters A and B applied to the image set 610 (FIG. 2A) are applied to the image set 660 (FIG. 2B). The positional relationship between the positions 631 and 632 with respect to the image 601 is the same as that between the positions 681 and 682 with respect to the image 651. Note that the number of positions in one image to which an image filter is applied is not limited to two. The number of image filters applied to one position of an image is not also limited to two.

As described above, in step S1001*b* (FIG. 1), for two images of each image set of a plurality of image sets (the image sets 610 to 613 shown in FIG. 2A and the image sets 660 to 663 shown in FIG. 2B), at least one predetermined image filter is applied to at least one predetermined position to produce at least one filter output value. Thus, a feature vector including the at least one filter output value as a component is calculated in a feature space.

Figure 3:
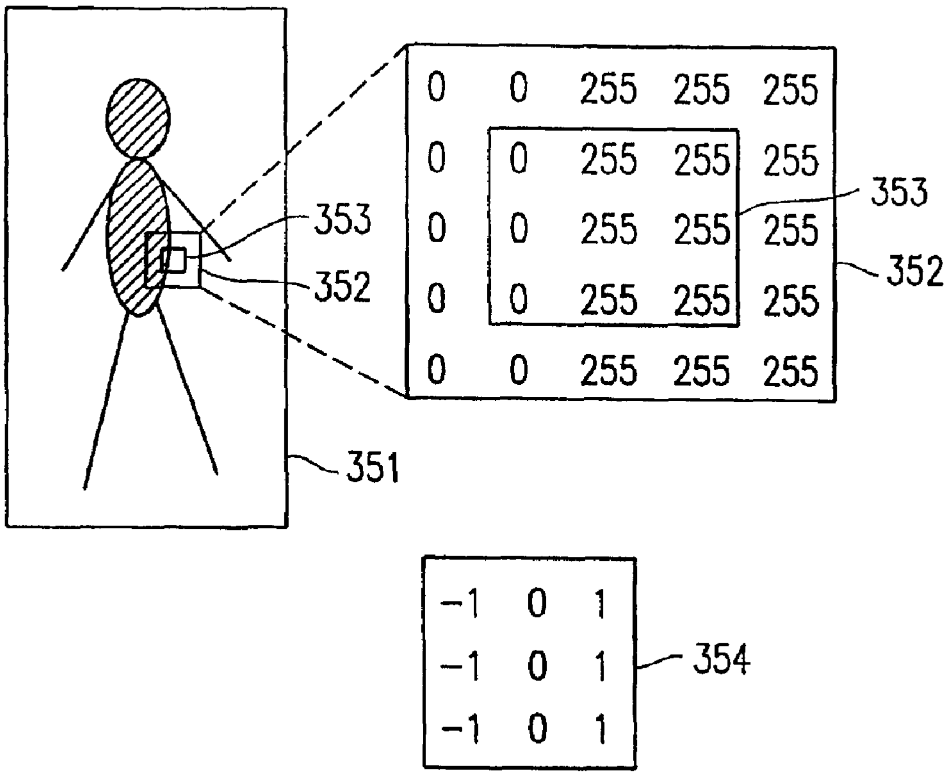
FIG. 3 is a diagram showing a case where an image filter 354 is applied to an image 351.

FIG. 3 is a diagram showing a case where an image filter 354 is applied to an image 351. In FIG. 3, the image filter 354 is applied to a position 353 of the image 351. An enlarged view of an image portion 352 which includes the position 353 is also shown in FIG. 3. Values within a rectangle representing a contour of the portion 352 indicate pixel values included in the image 351.

In FIG. 3, the image filter 354 has a size of 3×3. Values within a rectangle representing the image filter 354 indicate nine filter coefficients. A filter output value obtained by applying the image filter 354 to the position 353 of the image 351 is calculated as follows: the filter coefficients of the image filter 354 are multiplied by the corresponding pixel values and the nine products are summed. In this example, the filter output value is 765. This calculation of a filter output value is herein called a filter calculation. With this filter calculation, local feature information of an image is extracted as a filter output value.

Figure 4:
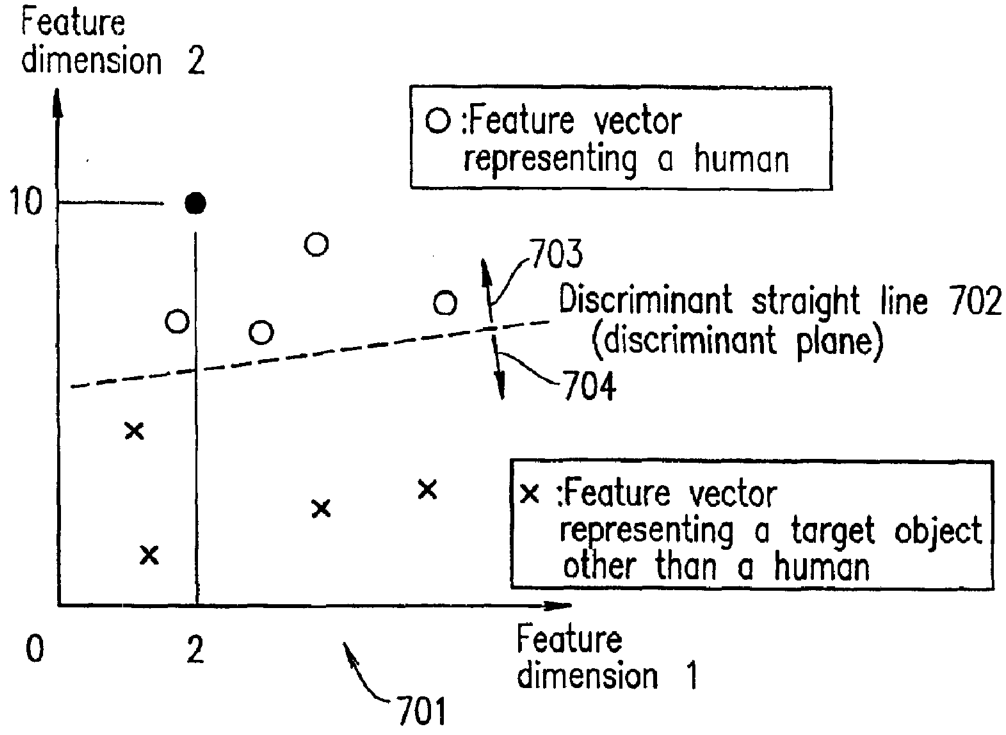
FIG. 4 is a graph showing a feature space 701 in which feature vectors obtained for each image set in step S1001*b* (FIG. 1) are plotted.

FIG. 4 is a graph showing a feature space 701 in which feature vectors obtained for each image set in step S1001*b* (FIG. 1) are plotted. Note that in FIG. 4, for clarification, the feature space 701 is represented as a two-dimensional space (i.e., a plane). The feature space 701 is defined by two dimensions, i.e., feature dimension 1 and feature dimension 2. A feature vector is represented by a point in the feature space 701. In FIG. 4, ○ indicates the feature vector of an image set (second image set) representing a human, and X indicates the feature vector of an image set (third image set) representing a target object other than a human. Hereinafter, the feature vector of an image set representing a human is also referred to as a "feature vector representing a human", and the feature vector of an image set representing a target object other than a human is also referred to as a "feature vector representing a target object other than a human".

A discriminant straight line 702 (discriminant plane) is provided in step S1001*c* (FIG. 1) so as to discriminate feature vectors indicated by ○ from those indicated by X. In FIG. 4, all of the feature vectors indicated by ○ are positioned above the discriminant straight line 702 (a first side indicated by arrow 703), and all of the feature vectors indicated by X are positioned below the discriminant straight line 702 (a second side thereof indicated by arrow 704). The discriminant straight line 702 may be determined by a support vector machines method, for example. The support vector machines method is described, for example, in V. Vapnic, "The Nature of Statistical Learning Theory", Springer Verlag, 1995. Alternatively, the discriminant straight line 702 may be determined by other methods, such as linear perceptron learning and discriminant analysis. As a learning algorithm, a nonparametric learning algorithm, such as a statistical parameter estimation method and a neural network method, may be used.

In FIG. 4, in the two-dimensional feature space 701, the discriminant straight line 702 discriminates (separates) the feature vectors of image sets (second image set) representing humans from the feature vectors of image sets (third image set) representing target objects other than a human. When the feature vectors of image sets (second image set) representing humans and the feature vectors of image sets (third image set) representing target objects other than a human are provided in an n-dimensional (n≧22) feature space, these feature vectors are discriminated by a discriminant plane. When the n-dimensional feature space is defined by a dimension $x_1$, a dimension $x_2$, . . . , and a dimension $x_n$, the discriminant plane is represented by:

$$a_1x_1+a_2x_2+ \ldots +a_nx_n+d=0 \quad (1).$$

The term "plane" as used hereinbelow refers to a set of points ($x_1$, $x_2$, . . . , $x_n$) satisfying expression (1) in an n-dimensional (n≧2) feature space. When n=2, expression (1) represents a straight line, which is included herein in the definition of a "plane".

Figure 5:
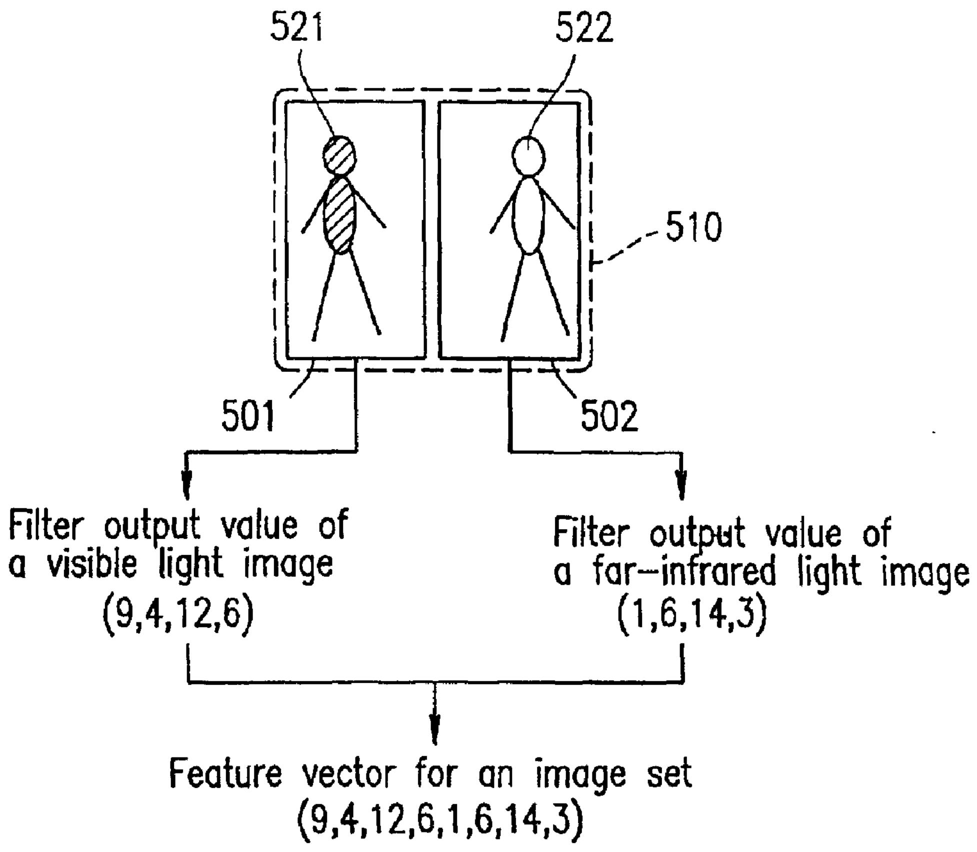
FIG. 5 is a diagram showing an image set to be recognized (first image set) 510 which is input in step S1002*a* (FIG. 1).

FIG. 5 is a diagram showing an image set to be recognized (first image set) 510 which is input in step S1002*a* (FIG. 1). The image set 510 includes a visible light image 501 representing a target object 521, and a far-infrared light image 502 representing a target object 522. The target object 521 and the target object 522 are the same target object (first target object).

In step S1002*b* (FIG. 1), the feature vector (first feature vector) of the image set 510 in a feature space is calculated. In FIG. 5, the feature vector of the image set 510 is (9, 4, 12, 6, 1, 6, 14, 3). This feature vector is calculated in a manner similar to that used in the calculation of the feature vector of the image set 610 in FIG. 2A. Specifically, in step S1002*b*, at least one predetermined image filter (image filters A and B) is applied to at least one predetermined position in each image (images 501 and 502) of the image set 510 to produce at least one filter output value. Thus, a feature vector (first feature vector) including the at least one filter output value as a component in a feature space is calculated.

Referring to FIG. 4, ● represents a first feature vector plotted in the feature space 701. Note that in FIG. 4, for simplicity, the first feature vector is represented as a two-dimensional feature vector (2, 10) but not an eight-dimensional feature vector.

In step S1002*c* (FIG. 1), whether or not a target object represented by the image set 510 (FIG. 5) is a human is judged based on a positional relationship between the first feature vector represented by ● and the discriminant straight line 702 in the feature space 701. In FIG. 4, the feature vector represented by ● is positioned above the discriminant straight line 702 (the first side thereof indicated by arrow 703). On the first side of the discriminant straight line 702 indicated by arrow 703, the feature vectors of image sets representing humans are positioned. Therefore, the target object represented by the image set 510 (FIG. 5) is judged to be a human.

As described above, according to the method of the present invention as shown in FIG. 1, the first target object represented by the image set 510 (FIG. 5) (the target object common to the visible light image 501 and the far-infrared light image 502 of the image set 510) is recognized as a human. Whether or not the first target object is categorized into the category "human" is judged based on the intensity (first attribute) of visible light reflected or emitted by a target object and the intensity (second attribute) of far-infrared light reflected or emitted by the target object. Therefore, the reliability of the recognition of a target object can be enhanced. Further, a predetermined image filter is applied to a predetermined position in each of the images 501 and 502 to produce a filter output value, thereby calculating a feature vector including the filter output value as a component in a feature space. The image set 510 is represented by this feature vector. This process does not require a matching between a region of the image 501 and a region of the second image 502, so that it is easy to provide the settings of recognition of the first target object and the results of recognition are not easily affected by environmental conditions.

Hereinafter, the present invention will be described by way of examples with reference to FIGS. 6 through 19. Like reference characters refer to like parts and as such overlapping description is omitted.

Figure 6:
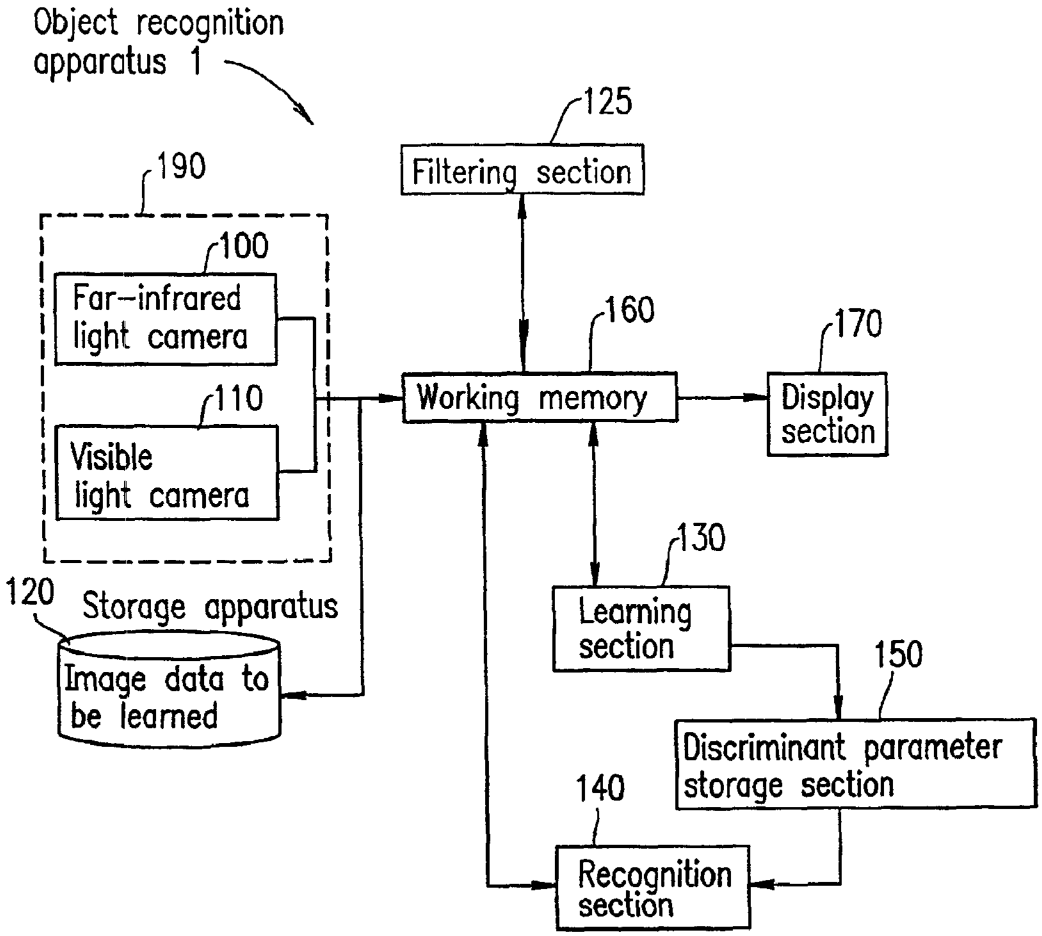
FIG. 6 is a diagram showing a configuration of an object recognition apparatus 1 according to an example of the present invention.

FIG. 6 is a diagram showing a configuration of an object recognition apparatus 1 according to an example of the present invention.

The object recognition apparatus 1 comprises a far-infrared light camera 100, a visible light camera 110, a storage apparatus 120 for storing learning image data (a set of images to be learned), a filtering section 125 for applying an image filter to an image, a learning section 130, a recognition section 140 for judging whether or not a target object represented by a image set captured by the far-infrared light camera 100 and the visible light camera 110 is categorized into a specific category (e.g., whether or not the target object is a human), a discriminant parameter storage section 150 for storing discriminant parameters which are used as a criterion in the judgment, a working memory 160, and a display section 170 for displaying a result of the recognition. The components of the object recognition apparatus 1 may be connected to one another via an internal bus or a network. Such a network includes any network, such as a wireless network, a wired network, and a telephone line network. The network may include the Internet.

The far-infrared light camera 100 captures a far-infrared light image, and the visible light camera 110 captures a visible light image. In the examples of the present invention, a luminance image was used as a visible light image.

The object recognition apparatus 1 may be used in: a surveillance system against outdoor intruders; a system for detecting a pedestrian, the apparatus being carried in a vehicle, such as an automobile; a vision system incorporated into a mobile robot; and the like.

As described above, the object recognition apparatus 1 performs a learning process and a recognition process as shown in FIG. 1.

The visible light camera 110 and the far-infrared light camera 100 performs the input process of an image set to be learned in step S1001*a* (FIG. 1), and the input process of an image set to be recognized (first image set) in step S1002*a* (FIG. 1). In other words, the visible light camera 110 and the far-infrared light camera 100 serve as an input section 190 which inputs an image set to be learned and an image set to be recognized into the object recognition apparatus 1. Alternatively, a visible light camera and a far-infrared light camera, which input a set of images to be learned into an object recognition apparatus, may be separated from a visible light camera and a far-infrared light camera, which input an image set to be recognized into the object recognition apparatus.

A set of images to be learned are grouped into an image set (second image set) representing a human as a target object and an image set (third image set) representing a target object other than a human, and are stored as learning image data in the storage apparatus 120. The storage apparatus 120 may be a hard disk drive, for example. Alternatively, the storage apparatus 120 may be any memory.

The filtering section 125 calculates a feature vector instep S1001*b* (FIG. 1) and step S1002*b* (FIG. 1). The filtering section 125 (feature vector calculation section) may be a digital signal processor, for example.

The learning section 130 performs calculation of a discriminant plane in step S1001*c* (FIG. 1).

The recognition section 140 (judgment section) performs judgment in step S1002*c* (FIG. 1) of whether or not a target object in an image set to be recognized is categorized into the specific category "human", for example.

The display section 170 displays a result of the recognition by the recognition section 140. Any display device may be used as the display section 170. The display section 170 may be omitted.

Figure 7A:
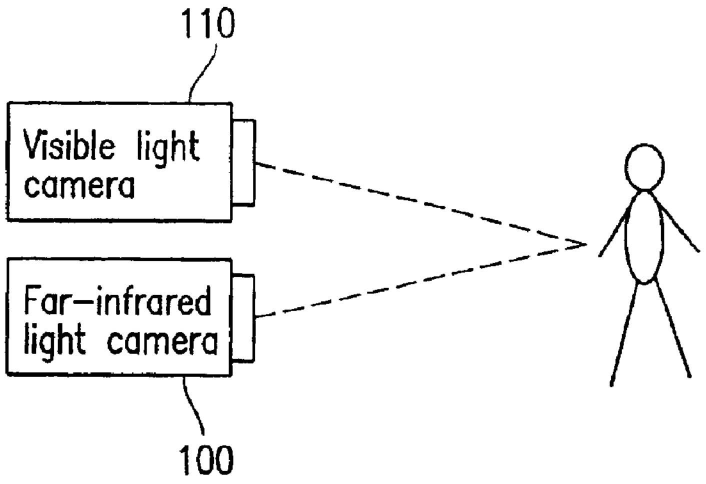
FIG. 7A is a diagram showing an arrangement of the far-infrared light camera 100 and the visible light camera 110.

FIG. 7A is a diagram showing an arrangement of the far-infrared light camera 100 and the visible light camera 110. In FIG. 7A, the far-infrared light camera 100 and the visible light camera 110 are arranged in parallel.

Figure 7B:
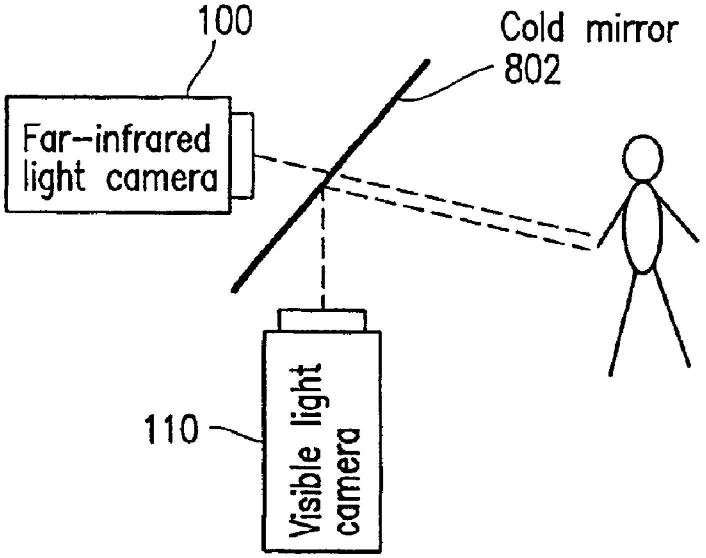
FIG. 7B is a diagram showing another arrangement of the far-infrared light camera 100 and the visible light camera 110.

FIG. 7B is a diagram showing another arrangement of the far-infrared light camera 100 and the visible light camera 110. In FIG. 7B, the far-infrared light camera 100 and the visible light camera 110 are arranged so that the optical axis of the visible light camera 110 reflected by a cold mirror 802 is aligned with the optical axis of the far-infrared light camera 100. A cold mirror is a mirror which reflects visible light and transmits far-infrared light.

The function of the far-infrared light camera 100 and the function of the visible light camera 110 may be performed by a single camera.

Figure 7C:
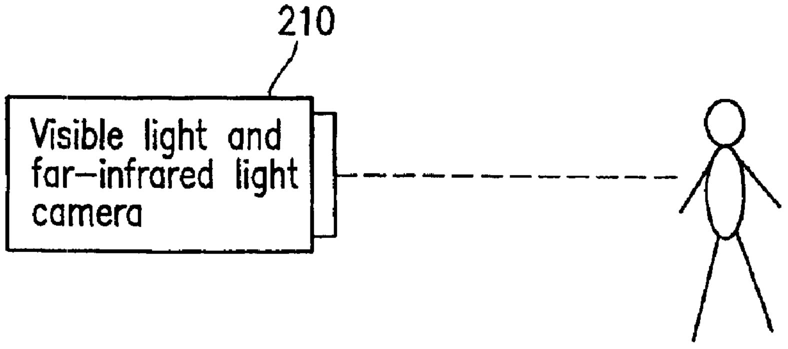
FIG. 7C is a diagram showing an exemplary visible light and far-infrared light camera 210 having the functions of the far-infrared light camera 100 and the visible light camera 110 instead of them.

FIG. 7C is a diagram showing an exemplary visible light and far-infrared light camera 210 having the functions of both the far-infrared light camera 100 and the visible light camera 110. The exemplary visible light and far-infrared light camera 210 has both a far-infrared camera function and a visible light camera function using an area sensor.

Figure 8A:
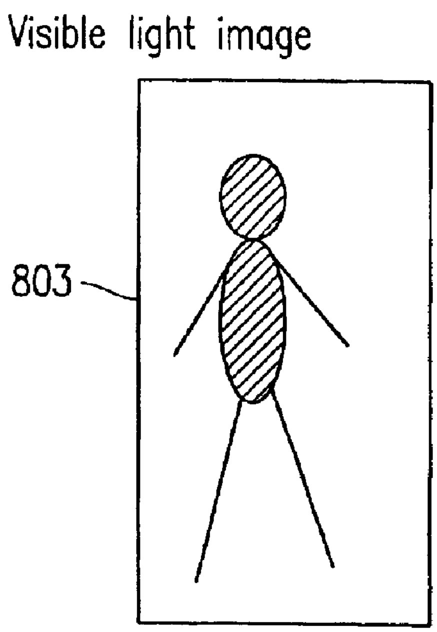
FIG. 8A is a diagram showing an exemplary visible light image 803 representing a human as a target object captured by the visible light camera 110.

FIG. 8A is a diagram showing an exemplary visible light image 803 representing a human as a target object captured by the visible light camera 110.

Figure 8B:
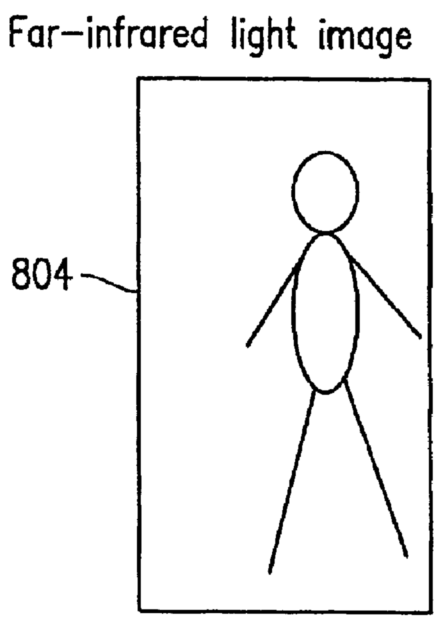
FIG. 8B is a diagram showing an exemplary far-infrared light image 804 representing a human as a target object captured by the far-infrared light camera 100.

FIG. 8B is a diagram showing an exemplary far-infrared light image 804 representing a human as a target object captured by the far-infrared light camera 100. The far-infrared light image 804 is obtained by capturing the same target object as that of the visible light image 803 shown in FIG. 8A substantially at the same time.

Figure 9A:
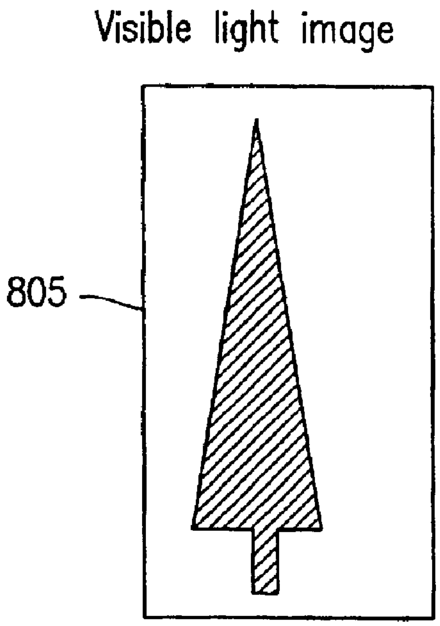
FIG. 9A is a diagram showing an exemplary visible light image 805 representing a target object (tree) other than a human captured by the visible light camera 110.

FIG. 9A is a diagram showing an exemplary visible light image 805 representing a target object (a tree) other than a human captured by the visible light camera 110.

Figure 9B:
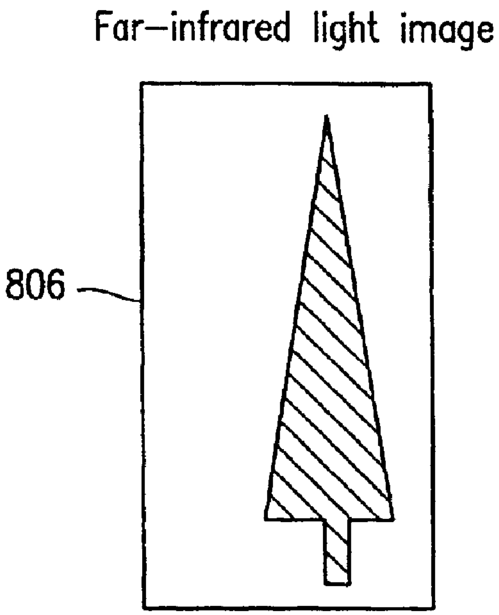
FIG. 9B is a diagram showing an exemplary far-infrared light image 806 representing a target object (tree) other than a human captured by the far-infrared light camera 100.

FIG. 9B is a diagram showing an exemplary far-infrared light image 806 representing a target object (the tree) other than a human captured by the far-infrared light camera 100. The far-infrared light image 806 is obtained by capturing the same target object as that of the visible light image 805 shown in FIG. 9A substantially at the same time.

The visible light images and far-infrared light images shown in FIGS. 8A, 8B, 9A and 9B constitute image sets (image sets to be learned or image sets to be recognized). A visible light image and a corresponding far-infrared light image have to include the same target object, but the visible light image and the far-infrared light image do not have to be accurately aligned pixel-by-pixel. For example, in the visible light image 803, a target object is shifted leftward from the center (FIG. 8A), whereas in the far-infrared light image 804 (FIG. 8B), the target object is shifted rightward from the center. Such a shift is not problematic, since in the present invention, neither a learning process nor a recognition process requires the matching of a region of the visible light image 803 and a region of the far-infrared light image 804. Therefore, it is not necessary to align the far-infrared light camera 100 with the visible light camera 110, and as such the settings of the object recognition apparatus 1 are easy to provide. Note that all visible light images in a set of images to be learned and a set of images to be recognized must have the same scale (length-to-width ratio), and must include a target object at a similar position. To this end, a predetermined region may be extracted from a visible light image captured by the visible light camera 110. The same applies to a far-infrared image included in an image set to be learned and an image set to be recognized.

Figure 10A:
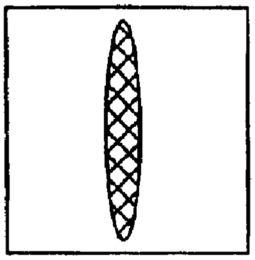
FIG. 10A is a schematic diagram showing a characteristic of an image filter used in the filtering section 125 (FIG. 6).

FIG. 10A is a schematic diagram showing a characteristic of an image filter used in the filtering section 125 (FIG. 6). When the image filter shown in FIG. 10A is applied to a specific position in an image, the filter selectively detects an edge at a specific position having a specific spatial frequency (an edge whose pixel values successively change within the width, minor axis, of an eclipse shown in FIG. 10A) in a specific direction (vertical direction).

Figure 10B:
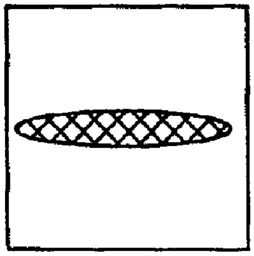
FIG. 10B is a schematic diagram showing a characteristic of an image filter for detecting a horizontal edge.

FIG. 10B is a schematic diagram showing a characteristic of an image filter for detecting a horizontal edge.

Figure 10C:
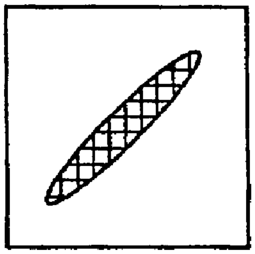
FIG. 10C is a schematic diagram showing a characteristic of an image filter for detecting an edge extending from the lower left to the upper right.

FIG. 10C is a schematic diagram showing a characteristic of an image filter for detecting an edge extending from the lower left to the upper right.

Figure 10D:
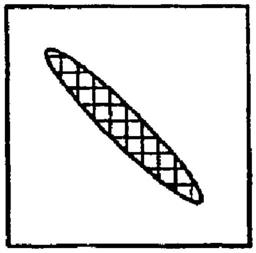
FIG. 10D is a schematic diagram showing a characteristic of an image filter for detecting an edge extending from lower the right to the upper left.
Figure 11A:
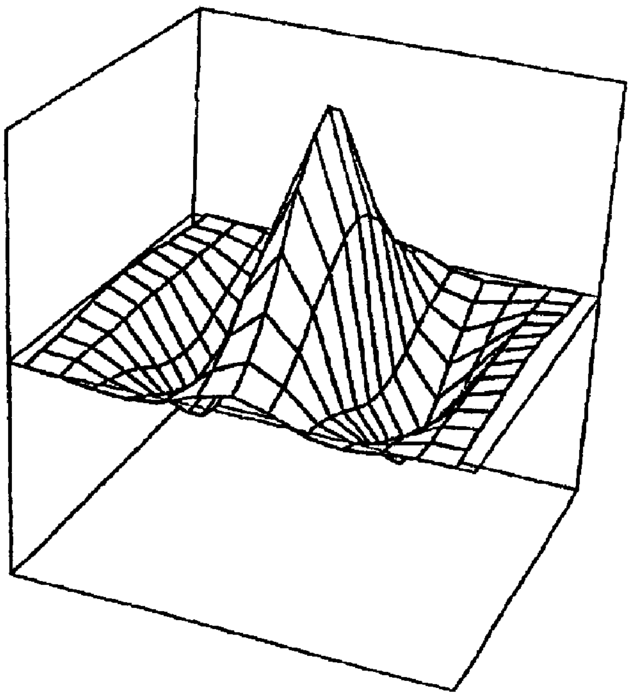
FIG. 11A is a diagram showing an example of filter coefficients of a Gabor filter.
Figure 11B:
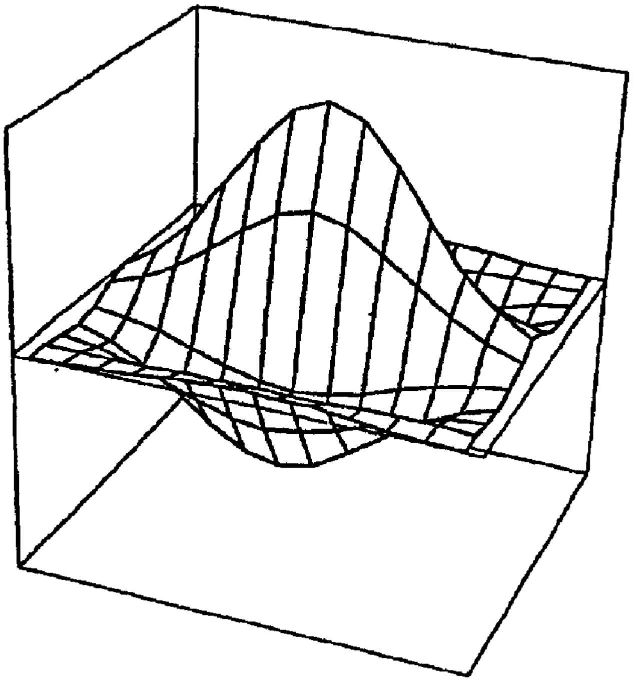
FIG. 11B is a diagram showing another example of filter coefficients of a Gabor filter.
Figure 11C:
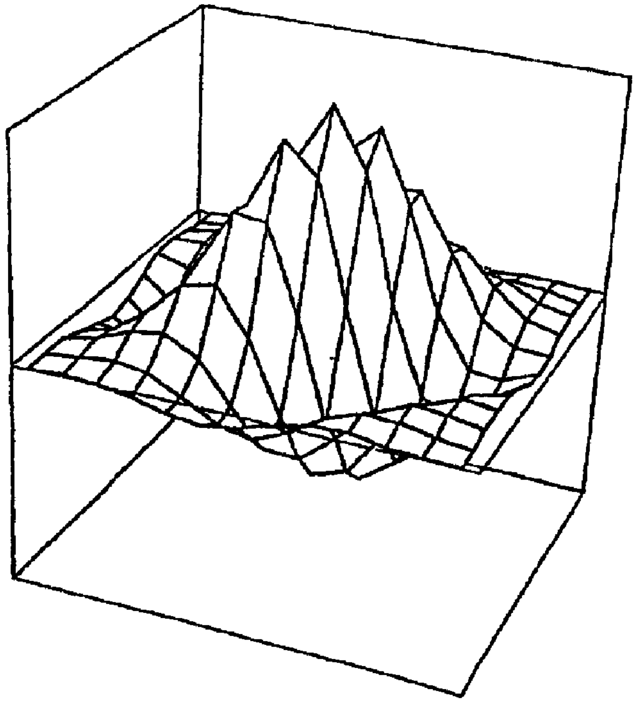
FIG. 11C is a diagram showing yet another example of filter coefficients of a Gabor filter.
Figure 11D:
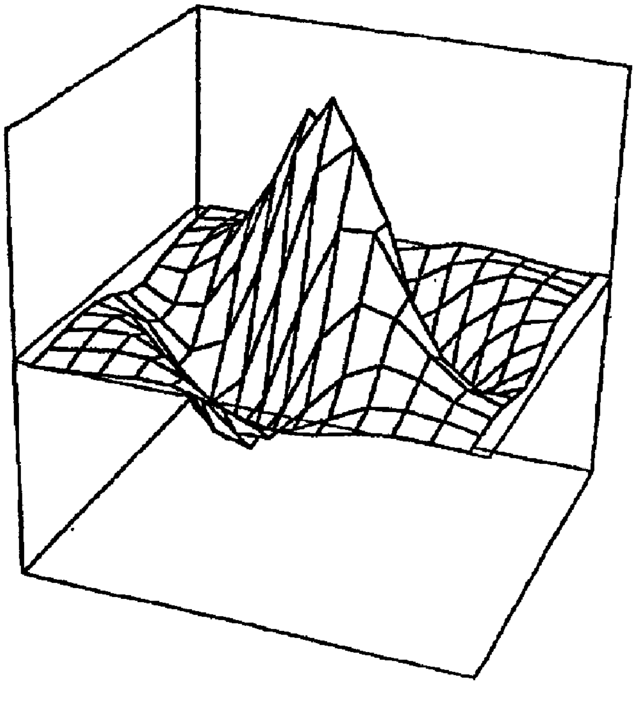
FIG. 11D is a diagram showing still another an example of filter coefficients of a Gabor filter.

FIG. 10D is a schematic diagram showing a characteristic of an image filter for detecting an edge extending from lower the right to the upper left.

The image filters shown in FIGS. 10A to 10D have directional selectivity (i.e., detects an edge having a specific direction), positional selectivity (i.e., detects an edge having a specific position) and a spatial frequency selectivity (i.e., detects an edge whose pixel values change at a specific spatial frequency). The term "spatial frequency" as used herein refers to a level of a change in pixel values (e.g., luminance) of an image with respect to their positions. An example of an image filter having such properties includes a Gabor filter. When a plurality of types of image filters (different levels of selectivity) having directional selectivity, positional selectivity, and spatial frequency selectivity are used, it is possible to reduce the occurrence of a redundant situation where different image filters detect information on the same edge, thereby reducing the number of required image filters. Accordingly, the amount of calculation required for the learning process S1001 and the recognition process S1002 can be reduced. It is thus possible to minimize an increase in the amount of calculation attributed to the use of a plurality of different types of images (a visible light image and a far-infrared light image).

An output value of one filter represents information on an edge having a specific spatial frequency in a specific direction at a specific position in an image. The representation of an image set by a feature vector including a filter output value as a component corresponds to the representation of the shape of a target object common to a visible light image and a far-infrared light image as a collection of edges.

FIGS. 11A to 11D are diagrams showing exemplary filter coefficients of Gabor filters. In FIGS. 11A to 11D, each grid point corresponds to one of the filter coefficients of a Gabor filter having 13×13 pixels. The values (real part) of the filter coefficients are represented by the height of the respective grid point. FIGS. 11A to 11D correspond to the respective image filters shown in FIGS. 10A to 10D.

Hereinafter, the learning and recognition processes of the object recognition apparatus 1 of the present invention will be described in more detail.

<Learning Process>

Figure 12:
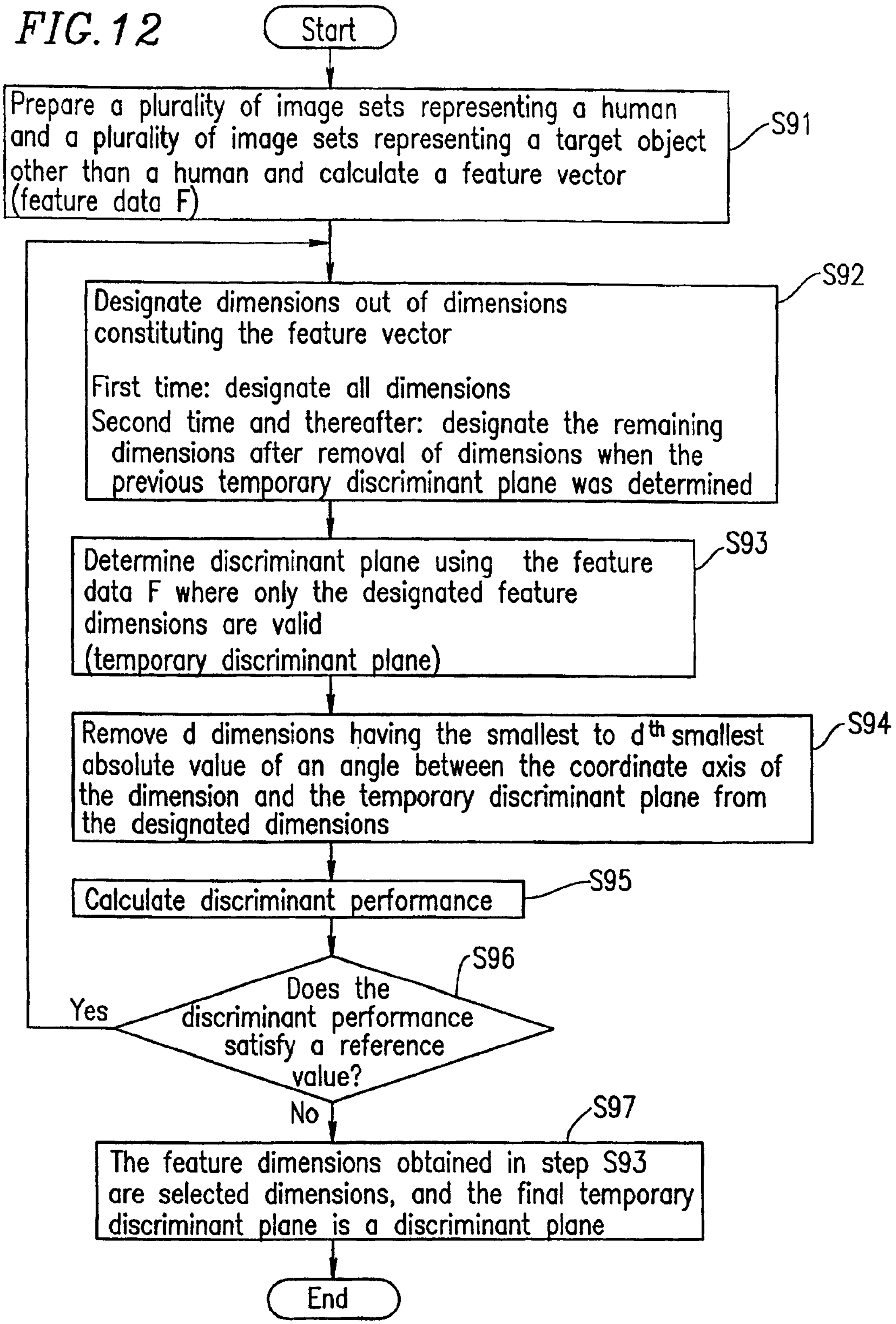
FIG. 12 is a flowchart showing a detailed learning process executed by the object recognition apparatus 1.

FIG. 12 is a flowchart showing a detailed learning process executed by the object recognition apparatus 1. Step S91 corresponds to step S1001*a* and step S1001*b* (FIG. 1), and steps S92 to S97 correspond to step S1001*c* (FIG. 1).

In step S91, a plurality of image sets (second image sets) representing a human and a plurality of image sets (third image sets) representing a target object(s) other than a human are prepared. A feature vector of each image set is calculated. A set of feature vectors calculated in step S91 is referred to as feature data F. A more detailed procedure of step S91 will be described later with reference to FIGS. 15 and 16. Hereinafter, it is assumed that in step S91, a 1032-dimensional feature vector is calculated for each image set. The present invention is not limited to this. Such a feature vector is represented by a point in a space defined by 1032 dimensions, i.e., feature dimension $x_1$, feature dimension $x_2$, feature dimension $x_3$, . . . , feature dimension $x_{1032}$.

In step S92, out of the 1032 feature dimensions, a predetermined number of feature dimensions used in the learning process are designated. Initially, all of the dimensions are designated, i.e., in this example, all of the 1032 dimensions (feature dimension $x_1$, feature dimension $x_2$, feature dimension $x_3$, . . . , feature dimension $x_{1032}$) are designated as feature dimensions used in the learning process. In second time and thereafter, a feature dimension(s) which remains after removal of a feature dimensions) (described later in step S94), is designated as a feature dimension(s) in the learning process. Steps S92 to S96 are repeated, so that the number of dimensions of the feature space is reduced. This process is referred to as a "removal process of feature dimensions".

In step S93, a lower-dimensional feature space is defined by the designated feature dimensions (note that initially, a 1032-dimensional feature space is defined). Each feature vector included in the feature data F is represented as a feature vector in this lower-dimensional feature space. The feature vector in the lower-dimensional feature space includes only components corresponding to the feature dimensions designated in step S92 out of the 1032 components in the 1032-dimensional feature vector included in the feature data F. Each component of a feature vector corresponds to one filter output value at one position in an image. The lower-dimensional feature vector includes, as a component, at least one filter output value obtained by applying at least one predetermined image filter to at least one predetermined position of two images in an image set.

Thereafter, in the lower-dimensional feature space, a discriminant plane, which discriminates (separates) feature vectors of image sets representing humans from feature vectors of image sets representing target objects other than a human, is calculated as a temporary discriminant plane.

The position of a feature vector with respect to the discriminant plane is represented by a weighted summation of the components of the feature vector corresponding to the respective feature dimension with the coefficients of the discriminant plane corresponding to the respective feature dimensions. For example, it is assumed that a three-dimensional discriminant plane is represented by $x+2y+3z=0$, and a feature vector (x, y, z) is (−1, 0, 4). The sum of the components of the feature vector (−1, 0, 4) weighted by the respective feature dimension coefficients (1, 2, 3) of the discriminant plane is $1\times(-1)+2\times0+3\times4=11$. The resultant value represents the distance between the feature vector (−1, 0, 4) and the discriminant plane. The sign and absolute value of this value represents a positional relationship between the feature vector and the discriminant plane.

When points to be categorized into two categories are distributed in a feature space, a discriminant plane (temporary discriminant plane) which separates the categories may be obtained by the above-described support vector machines method or the like.

Using such a method, a discriminant plane (temporary discriminant plane), which separates feature vectors of image sets representing humans in a feature space from feature vectors of image sets representing target objects other than a human, is calculated. The separation may not be necessarily perfect. Some feature vectors (e.g., a feature vector of an image set representing a human) may be positioned on the opposite side of the discriminant plane (a side of the plane on which feature vectors of image sets representing target objects other than a human), termed herein as erroneous discrimination. Note that the number of erroneously discriminated feature vectors is preferably small. A method for determining a discriminant plane may be selected from a plurality of techniques in order to reduce erroneously judged feature vectors.

In step S94, out of the coordinate axes corresponding to feature dimensions designated in step S92, d coordinate axes which have the smallest to $d^{th}$ smallest absolute values of angles with respect to the temporary discriminant plane determined in step S93 are removed from the feature dimensions (feature dimensions to be used in the learning process) designated in step S92. The value of d is a predetermined integer of 1 or more.

For example, when in a three-dimensional feature space (the coordinate axes are represented by x, y, and z) and a temporary discriminant plane is represented by $x+2y+3z=0$, the absolute values of the angles between the temporary discriminant plane and the x, y, and z axes ascend in this order. In this case, when it is assumed that d=1, the feature dimension corresponding to the x axis is removed from the feature dimensions used in the learning process. Instead of using the angle between each coordinate axis and the discriminant plane, the angle $\delta$ between each coordinate axis and the normal to the discriminant plane is used and d coordinate axes having the largest to $d^{th}$ largest absolute values of the angle $\delta$ may be removed. In this case, the same effect as described above can be obtained. The direction of the normal to the discriminant plane is represented by the normal vector having the coefficients representing the temporary discriminant plane as components. For example, the direction of the normal to a temporary discriminant plane, $x+2y+3z=0$, is represented by the normal vector (1, 2, 3).

Referring to FIG. 4 again, the reason some feature dimensions are removed from the feature dimensions used in the learning process will be described below.

In FIG. 4, an angle between an axis (horizontal axis) corresponding to the feature dimension 1 and the discriminant straight line (discriminant plane) 702 is smaller than an angle between an axis (vertical axis) corresponding to the feature dimension 2 and the discriminant straight line (discriminant plane) 702. This means that the feature dimension 1 is less important for discrimination (separation) of feature vectors of image sets representing humans from feature vectors of image sets representing target objects other than a human than the feature dimension 2. In other words, the value of the feature dimension 2 (filter output value) has a large influence on the judgment of whether or not a target object is a human. In FIG. 4, in step S94 (FIG. 12), the feature dimension 1 is removed from the feature dimensions 1 and 2.

A value of a feature dimension corresponds to a filter output value at a position in a visible light image or a far-infrared light image included in an image set. As described above, when a discriminant straight line (or a discriminant plane) has been calculated, it is possible to determine which feature dimension (filter output value) is more important out of a plurality of filter output values from a visible light image or from a far-infrared light image. In step S94 (FIG. 12), an unimportant feature dimension, which does not contribute to discrimination, is removed from feature dimensions used in the learning process. Referring to FIG. 12 again, a detailed learning process will be described.

In step S95, the number of coordinate axes in a feature space is reduced by d, and discriminant performance is assessed using such a lower-dimensional feature space. This assessment is conducted as to how accurately feature vectors representing a human in the feature data F can be discriminated (separated) from feature vectors representing a target object other than a human in the lower-dimensional feature space which is newly defined in step S94 by removing d coordinate axes (feature dimensions). Step S95 will be described later in more detail with reference to FIG. 17.

In step S96, whether or not the discriminant performance satisfies a reference value is judged. If the result of step S96 is "No", the process goes to step S97. If the result of step S96 is "Yes", the process returns to step S92 (another feature dimension or dimensions will be further removed).

In step S97, the feature dimension(s) used in step S93 is designated as a selected dimension(s). In addition, the temporary discriminant plane calculated in step S93 is designated as a discriminant plane. This discriminant plane is used in a subsequent recognition process as a criterion. The discriminant plane is a plane which is present in a space (feature space) defined by the feature dimensions designated as selected dimensions in step S97. Note that in step S96, the process in the first time may go to step S92 unconditionally.

As described above, in steps S92 to S96, the learning section 130 (FIG. 6) defines a feature space, which is used in the recognition process, by removing at least one dimension from a temporary feature space, which has a higher number of dimensions than the feature space used in the recognition process, based on the normal vector to a temporary discriminant plane, which is used to discriminate feature vectors of image sets representing humans (second image set) than feature vectors of image sets representing target objects other than a human (third image sets).

In step S97, it is assumed that out of 1032 feature dimensions, i.e., feature dimensions $x_1, x_2, x_3, \ldots, x_{1032}$, m feature dimensions (m is an integer of 1 or more and 1032or less), i.e., feature dimensions $x_{a1}, x_{a2}, \ldots, x_{am}$ (numerical subscripts a1, a2, a3, . . . , am are integers of 1 or more and 1032 or less) are designated as selected dimensions. Such a list of selected dimensions (feature dimensions $x_{a1}, x_{a2}, \ldots, x_{am}$) indicates which filter outputs of a visible light image and a far-infrared light image included in an image set will be used in the subsequent recognition process. In other words, the list of selected dimensions defines how information on a visible light image and information on a far-infrared light image is combined.

The discriminant plane determined in step S97 is represented by the list of selected dimensions and the corresponding coefficients. These parameters representing the discriminant plane are stored in the discriminant parameter storage section 150 (FIG. 6).

In the above-described procedure, step S95 may be omitted and the judgment in step S96 may be replaced with a judgment of whether or not the number of removed feature dimensions reaches a predetermined value. Specifically, when the number of removed feature dimensions reaches a predetermined number, the process goes to step S97. If not, the process goes to step S92. By this procedure, the number of feature dimensions can be set to a predetermined value.

Note that when the value of d used in step S94 is large, the number of repetitions of steps S92 to S96 can be small, thereby reducing the amount of calculation. Conversely, when the value of d is small, a large number of feature dimensions are not removed in one cycle, whereby it is possible to determine a number of feature dimensions necessary and sufficient to obtain a desired discriminant performance as selected dimensions.

Note that in the subsequent recognition process, a discriminant surface (not limited to a plane) other than the discriminant plane determined in step S97 may be used as a criterion for judgment (discriminant parameters). Such a discriminant surface is provided so as to discriminate feature vectors representing humans from feature vectors representing target objects other than a human in a space defined by the selected dimensions. Any discriminant method for discriminating feature vectors representing a human from feature vectors representing target objects other than a human in a space defined by the selected dimensions, and discriminant parameters used in the discriminant method are adopted in the subsequent recognition process to judge whether or not a target object is a human.

In the subsequent recognition process, a linear discriminant method may be used, or a nonlinear discriminant method may be used. An example of a linear discriminant method is a method for determining whether or not a target object is a human based on which side of a discriminant plane represented by the discriminant parameters determined in step S97 the feature vector of the target object is present. Examples of a nonlinear discriminant method include a k-NN method, a perceptron using nonlinear elements, LVQ, and nonlinear SVM. An example of a nonlinear discriminant method will be described with reference to FIGS. 13A to 13C.

Figure 13A:
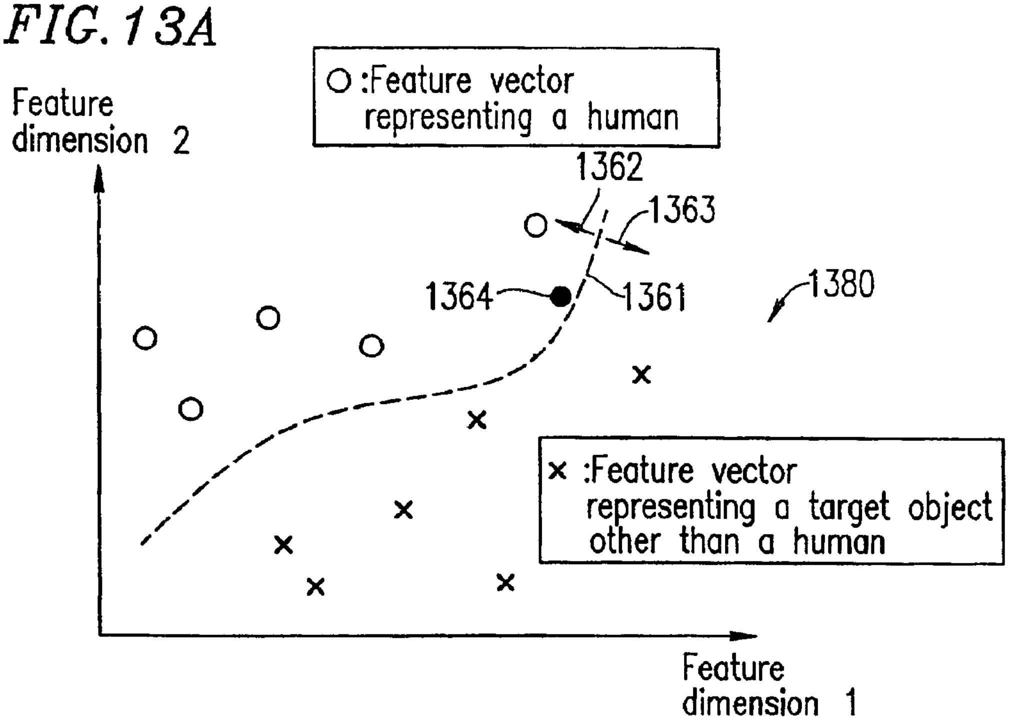
FIG. 13A is a diagram for explaining a discriminant method using a curved discriminant surface.
Figure 13B:
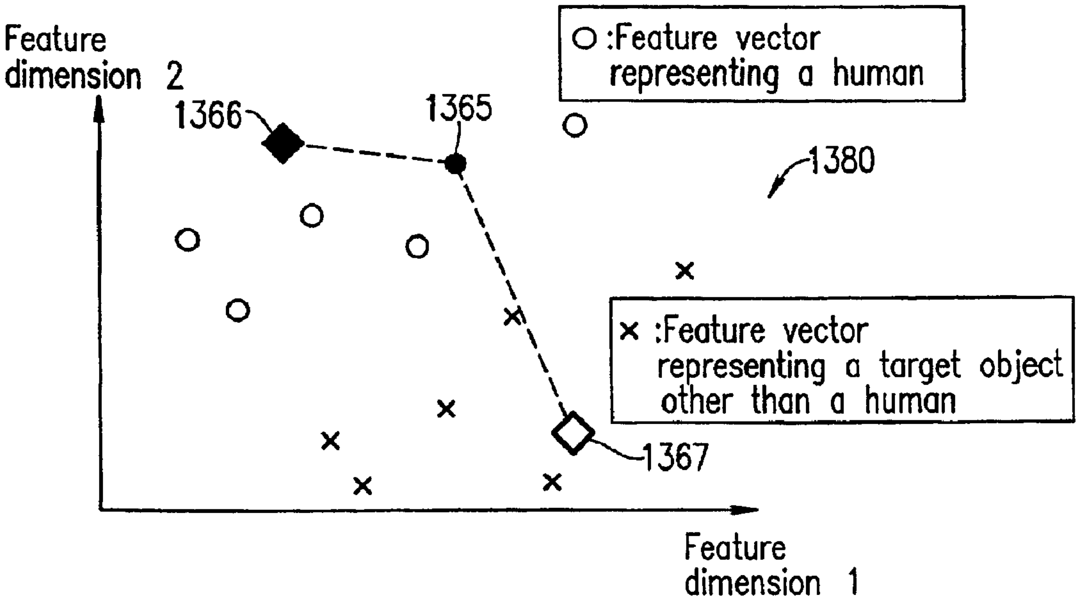
FIG. 13B is a diagram for explaining a discriminant method using a distance in the feature space 1380.
Figure 13C:
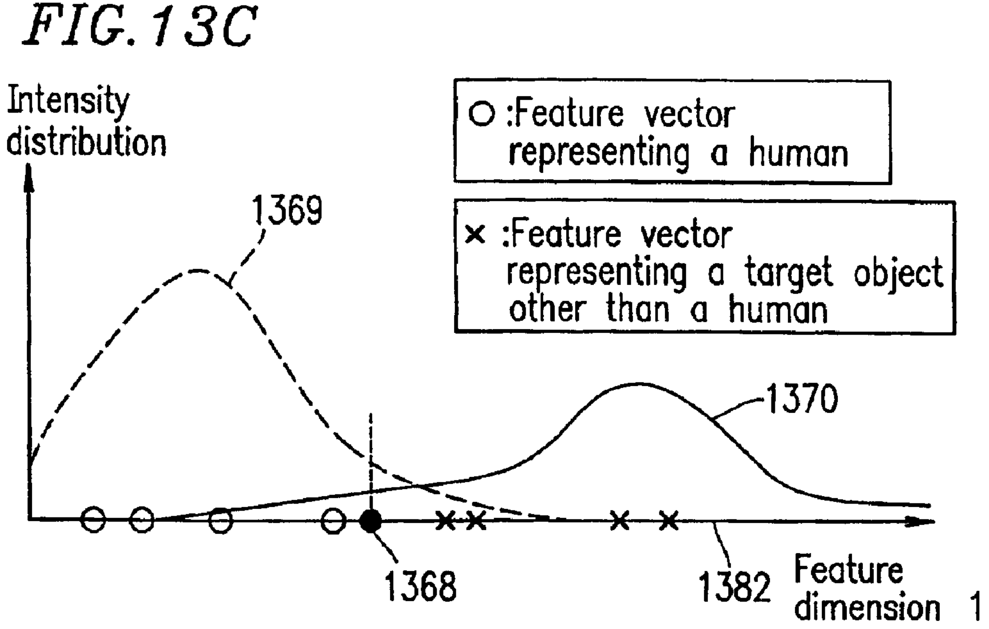
FIG. 13C is a graph for explaining a discriminant method using distribution of feature vectors in a feature space 1382.

FIG. 13A is a diagram for explaining a discriminant method using a curved discriminant surface. A space 1380 is a feature space defined by selected dimensions. In FIG. 13A, the feature space 1380 is a plane defined by two selected dimensions, i.e., a feature dimension 1 and a feature dimension 2. A discriminant surface 1361 is represented by a curved line. In FIGS. 13A to 13C, ○ indicates a feature vector representing a human, and X indicates a feature vector representing a target object other than a human.

The discriminant surface 1361 discriminates a feature vector representing a human from a feature vector representing a target object other than a human in the feature space 1380. In this example, a feature vector (○) representing a human is present on a first side (indicated by arrow 1362) of the discriminant surface 1361 and a feature vector (X) representing a target object other than a human is present on a second side (indicated by arrow 1363) of the discriminant surface 1361. The discriminant surface 1361 may be represented by an expression having variables in the feature dimensions 1 and 2, for example. Coefficients of such an expression are stored in the discriminant parameter storage section 150 (FIG. 6) as discriminant parameters.

A point 1364 indicates a feature vector for an image set to be input in a subsequent recognition process (an image set to be recognized). In FIG. 13A, the feature vector 1364 is present on the first side of the discriminant surface 1361. Therefore, a target object in the image set to be recognized is judged to be a human.

FIG. 13B is a diagram for explaining a discriminant method using a distance in the feature space 1380. Examples of such a discriminant method include a k-NN method and LVQ. A representative point 1366 indicates a feature vector representing a human (a representative point indicating a category "human"). The representative point 1366 may be a center of mass of all feature vectors indicating humans, for example. Similarly, a representative point 1367 indicates feature vectors representing target objects other than a human (a representative point indicating a category "not a human"). The representative points 1366 and 1367 are represented by coordinates indicating these points in a feature space. Such coordinates are stored as discriminant parameters in the discriminant parameter storage section 150 (FIG. 6).

A point 1365 indicates a feature vector for an image set to be input in a subsequent recognition process (an image set to be recognized). In this discriminant method, a category to which a representative point closest to the feature vector is categorized is a result of recognition of the feature. In FIG. 13B, a category indicated by a representative point (representative point 1366) closest to the feature vector 1365 is the "human" category, whereby a target object in the image set to be recognized is judged to be a human.

FIG. 13C is a graph for explaining a discriminant method using distribution of feature vectors in a feature space 1382. An example of such a discriminant method is a neural network, such as a perceptron, using nonlinear elements. In FIG. 13C, the feature space 1382 is represented by one selected dimension (feature dimension 1), i.e., the feature space 1382 is one-dimensional (a straight line). Curved lines 1369 and 1370 indicate the intensity distribution of a feature vector representing a human (intensity distribution indicating a category "human") and the intensity distribution of a feature vector representing a target object other than a human (intensity distribution indicating a category "not a human"), respectively. The curved lines 1369 and 1370 may be represented by expressions having a variable in the feature dimension 1. Such coordinates are stored as discriminant parameters in the discriminant parameter storage section 150 (FIG. 6).

A point 1368 indicates a feature vector for an image set to be input in a subsequent recognition process (an image set to be recognized). In this discriminant method, a plurality of intensity distributions are compared with one another at a position of the feature vector. A category indicated by an intensity distribution having a largest value indicates a result of the recognition of the feature vector. In FIG. 13C, at a position of the feature vector 1368, the intensity distribution 1369 indicating a category "human" is larger than the intensity distribution 1370 indicating a category "not a human", whereby the target object in the image set to be recognized is judged to be a human.

Thus, the discriminant parameters not only represents a discriminant plane, but also represents parameters used in any discriminant method for discriminating feature vectors belonging to different categories in a feature space.

Figure 14:
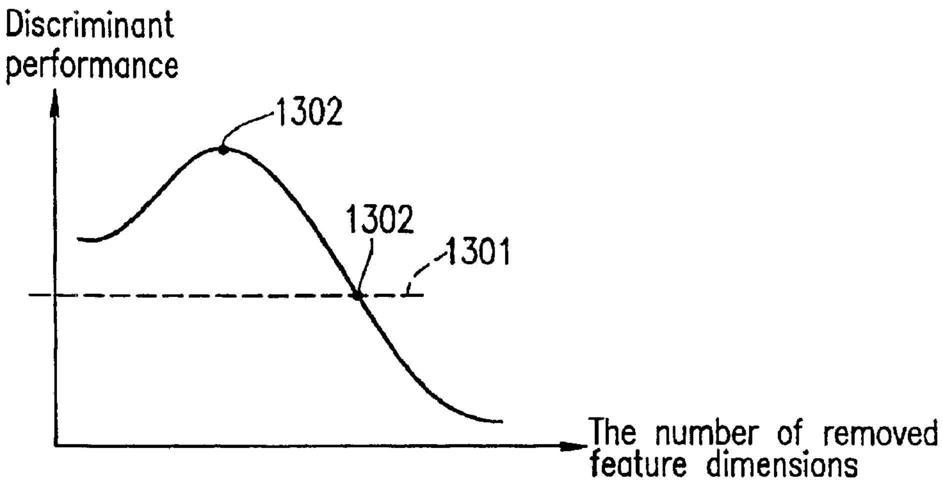
FIG. 14 is a schematic diagram showing a change in discriminant performance due to the removal of feature dimensions.

FIG. 14 is a schematic diagram showing a change in discriminant performance due to the removal of feature dimensions. As shown in FIG. 14, initially, discriminant performance is increased by the removal of feature dimensions. This is because a feature dimension which substantially does not contributes to discrimination is removed, thereby reducing excessive information (noise) having an adverse influence on discrimination.

In general, a simple combination of a plurality of pieces of image information having different attributes, such as a visible light image and a far-infrared light image leads to an increase in information amount and therefore, the amount of discrimination process is increased and the number of samples required for the learning process (the number of image sets to be learned) is increased. It is thus difficult to collect samples. When the number of image sets to be learned is insufficient, discriminant performance is likely to be deteriorated. However, in an example of the present invention, information on a visible light image and information on a far-infrared light image are combined and some of the feature dimensions are removed in steps S92 to S96. By removing some feature dimensions to select effective information for discrimination, the amount of calculation required for the subsequent recognition process can be reduced and discriminant performance can be improved (or maintained).

The inventors of the present invention conducted a simulation using 858 image sets representing a human and 11052 image sets representing a target object other than a human. In steps S92 to S96, the number of feature dimensions was reduced by 88%, and the probability of erroneous discrimination was reduced by a factor of 9.

The judgment in step S96 (FIG. 12) is, for example, conducted as follows. A change in discriminant performance obtained in step S95 is monitored, and the previous discriminant performance is compared with the current discriminant performance. If the current discriminant performance is improved or maintained, the criterion is judged as being satisfied. If the current discriminant performance is lowered, the criterion is judged as not being satisfied. When such a judgment is conducted, a maximum of the discriminant performance as indicated by a point 1302 shown in FIG. 14 can be obtained.

The judgment in step S96 (FIG. 12) may be conducted in another manner. For example, an absolute discriminant performance value (reference numeral 1301 shown in FIG. 14) is predetermined. Under a condition that the predetermined discriminant performance is obtained, feature dimensions may be removed as much as possible. In this case, a maximum number of feature dimensions can be removed where the predetermined discriminant performance value is satisfied (point 1302).

Figure 15:
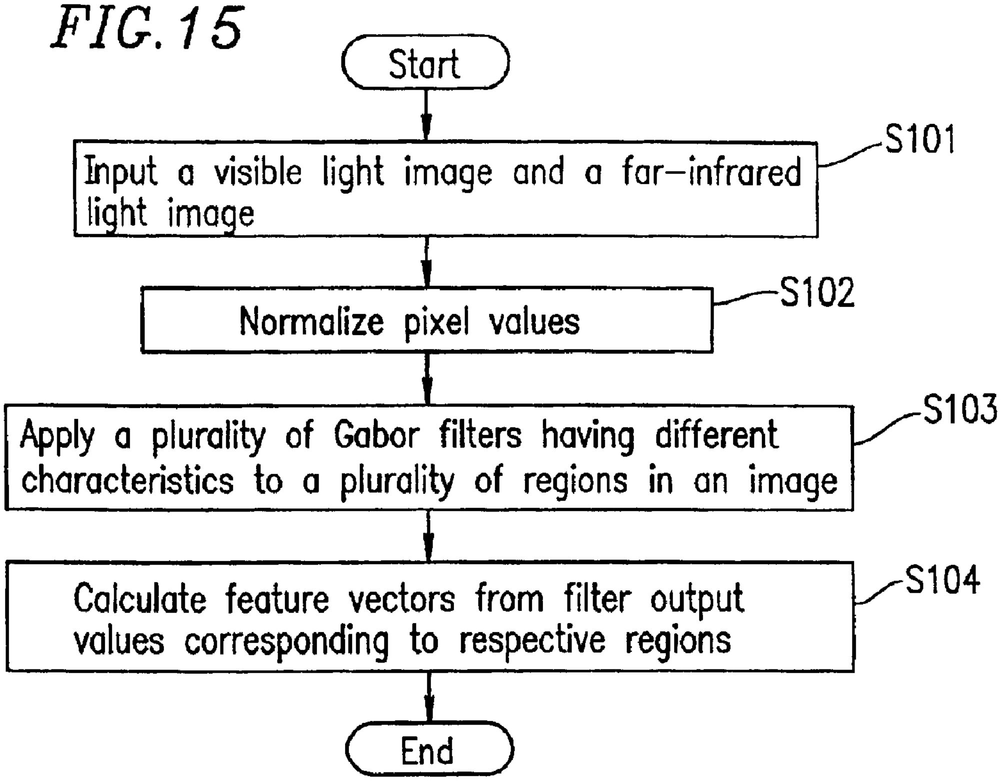
FIG. 15 is a flowchart showing a more detailed procedure of step S91 (FIG. 12).

FIG. 15 is a flowchart showing a more detailed procedure of step S91 (FIG. 12). Note that step S101 in FIG. 15 corresponds to step S1001*a* (FIG. 1), and steps S102 to S104 correspond to step S1001*b* (FIG. 1).

In step S101, a visible light image and a far-infrared light image are input. The visible light image and the far-infrared light image constitute an image set. In step S101, an image set representing a human (including a visible light image and a far-infrared light image representing the same human), and an image set representing a target object other than a human (including a visible light image and a far-infrared light image representing a target object other than a human) are input. An example of such an image set is described above with reference to FIGS. 2A and 2B.

A visible light image and a far-infrared light image input in step S101 are captured by the visible light camera 110 and the far-infrared light camera 100, and temporarily stored as an image set to be learned in the storage apparatus 120. Alternatively, a visible light image and a far-infrared light image may be read out from a recording medium (not shown) and input to the object recognition apparatus 1.

In step S102, each image (a visible light image and a far-infrared light image) is subjected to pixel-by-pixel basis normalization. The normalization of pixel values is conducted in accordance with the following expression (2):

$$I'(x, y)=(I(x, y)-m)/\sigma \quad (2)$$

where

I(x, y): a pixel value at a coordinate point (x, y) of an image before normalization;

m: an average of pixel values in the entire image;

σ: a standard deviation of pixel values of the entire image deviated from the average; and I'(x, y): a normalized pixel value at a coordinate point (x, y) in the image.

In step S103, for the image having the normalized pixel values, Gabor filters having a plurality of different properties are applied to a plurality of regions in the image.

In step S104, a feature vector is obtained from filter output values obtained by applying a Gabor filter to the respective regions (specified regions).

Figure 16:
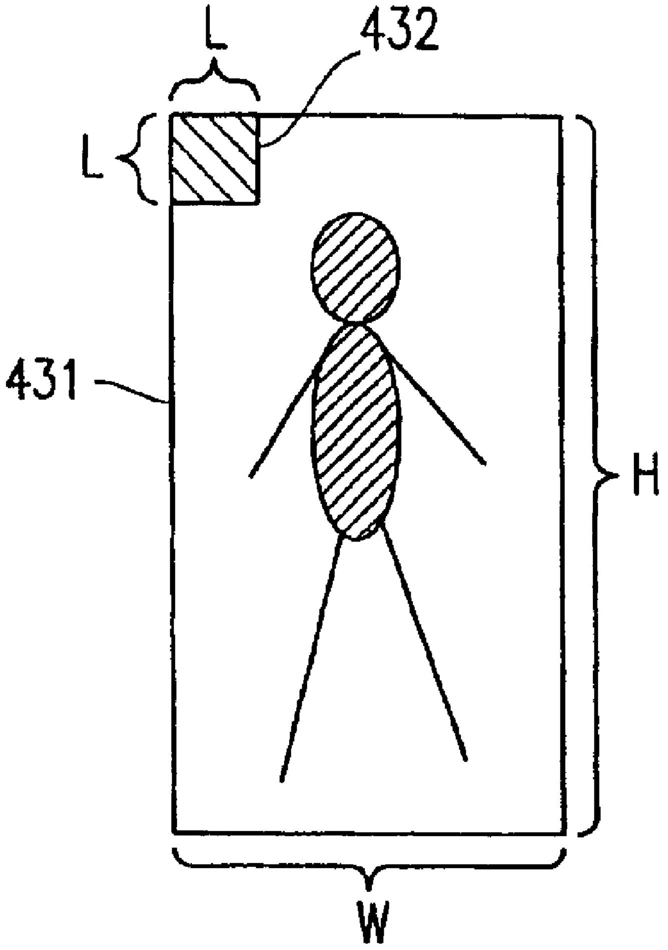
FIG. 16 is a diagram showing a relationship between an image 431, and a region 432 in the image 431 to which an image filter is applied.

FIG. 16 is a diagram showing a relationship between an image 431, and a region 432 in the image 431 to which an image filter is applied. The image 431 is a visible light image or a far-infrared image input in step S101 (FIG. 15). The region 432 indicates a region to which an image filter is applied. Hereinafter, the region 432 in the image 431 to which an image filter is applied is referred to as a "specified region". Referring to FIG. 16, step S103 and step S104 (FIG. 15) will be described in detail.

In the example shown in FIG. 16, the specified region 432 is in the shape of a square having a side length of L. The image 431 is in the shape of a rectangle having a size of H (length)×W (width). A plurality of specified regions 432 are provided in the image 431. A Gabor filter having the same size as that of the specified region 432 is applied to each specified region 432, thereby producing a filter output value at the specified region 432. The production of a filter output value is described above with reference to FIG. 3.

The filtering section 125 (FIG. 6), for example, provides a plurality of specified region 432 in the image 431 where the specified regions 432 are permitted to overlap each other, and cover the image 431. For example, in FIG. 16, the specified region 432 has a size of L (size 1) where L=H/8 and W=H/2, the specified regions 432 are arranged in the entire image 431 where adjacent regions 432 overlap each other by L/2 in both a lengthwise direction and a widthwise direction. In this case, the number of specified regions in the image 431 is equal to (H/L×2−1)×(W/L×2−1) (=15×7=105). Four image filters having different characteristics (different directional selectivities, i.e., four directional selectivities shown in FIGS. 11A to 11D) are applied to each specified region 432.

Further, a specified region having a different size is arranged over the entire image 431. An image filter having a different size is applied to the specified region having a different size. It is assumed that the specified region is a square having a side length of L=H/4 (size 2). When the specified regions are arranged to cover the entire image 431 where adjacent specified regions overlap each other by L/2 in both lengthwise and widthwise directions, the number of specified regions is equal to (H/L×2−1)×(W/L×2−1) (=7×3=21), where W=H/2. Similarly, when the specified region is a square having a side length of L=H/2 (size 3), the number of specified regions is equal to (H/L×2−1)×(W/L×2−1) (=3×1=3), where W=H/2.

The sum of the numbers of specified regions in the image 431 having three different sizes (size 1, size 2 and size 3) is 105+21+3=129. Four image filters having different directional selectivities are applied to each specified region, thereby obtaining 516 (129×4) filter output values from the image 431. An image set (an image set to be learned or recognized) includes a visible light image (luminance image) and a far-infrared light image. When the visible light image and the far-infrared light image have the same size (W×H) and a specified region is provided at the same position between the visible light image and the far-infrared light image, the number of filter output values obtained from an image set (two images) is 516×2=1032. Therefore, a 1032-dimensional feature vector is represented by an image set. Alternatively, a higher-dimensional feature space may be provided, and a higher dimensional feature vector may be obtained by mapping the 1032-dimensional feature vector to the higher-dimensional feature space. When a feature vector is mapped to a higher-dimensional feature space, distances between feature vectors corresponding to the respective image sets are increased. Therefore, in subsequent step S93 (FIG. 12), it is advantageously easy to calculate a discriminant plane.

Note that the number of directions of the Gabor filters is not limited to four. The number of directions of the Gabor filters may be changed depending on the sizes of the Gabor filters and/or the positions of specified regions. When the number of directions of the Gabor filters may be changed depending on the sizes of the Gabor filters and/or the positions of the specified regions, a larger amount of information can be efficiently obtained from a specific position of an image (e.g., a position at which directions of the edges are to be precisely distinguished) and/or a specific spatial frequency region.

Further, the number of image filter sizes is not limited to three. There may be one or more image filter sizes. Spatial frequency characteristics of a change in pixel values (luminance) are different between a visible light image and a far-infrared light image. Therefore, a large amount of information can be efficiently obtained by changing the size of an image filter applied to a visible light image and a far-infrared light image.

The size and position of a specified region may not be necessarily the same between a visible light image and a far-infrared light image. Discriminant performance can be expected to be improved by providing the size and position suitable for each of a visible light image and a far-infrared light image. However, when the same size and position of a specified region is used for both images, the same image filtering process can be advantageously applied to both images, whereby the scale of the hardware circuitry and software can be reduced.

Examples of an image filter may include a filter having a similar shape to a Gabor filter and another image filter for detecting an edge. Further, an image filter other than a filter for detecting an edge may be used. If a Gabor filter or an image filter having a shape similar thereto is used, it is possible to efficiently obtain information on a change in luminance local to a positional space and a frequency space. Therefore, when a Gabor filter or an image filter having a shape similar thereto is used, information on a spatial change in specific spatial frequency can be efficiently obtained as compared to an edge filter, such as a sobel filter. As a result, when images having different properties, such as a visible light image and a far-infrared light image, are combined, effective information for recognition can be efficiently obtained from an increased amount of information. Information on a visible light image and information on a far-infrared light image may be effectively combined to be used for recognition without obtaining information on temperature obtained from a far-infrared light image.

Further, in FIG. 16, specified regions (regions to which a Gabor filter is applied) having a plurality of sizes are provided in the image 431 having a single size. Alternatively, when specified regions (regions to which a Gabor filter is applied) having the same size are provided in a plurality of images of different sizes obtained by capturing the same target object at different resolutions in advance, the same effect can be obtained.

In a far-infrared light image and a visible light image, a captured target object may not be necessarily present at the same position (e.g., the images of the target object may be shifted with reference to each other in the vertical and/or horizontal directions). The target objects may not be necessarily present at the same position between a visible light image and a far-infrared light image as long as a positional relationship when other target objects are captured is maintained. This is because in the learning and recognition processes of the present invention, the matching between a region in a far-infrared light image and a region in a visible light image is not required.

Figure 17:
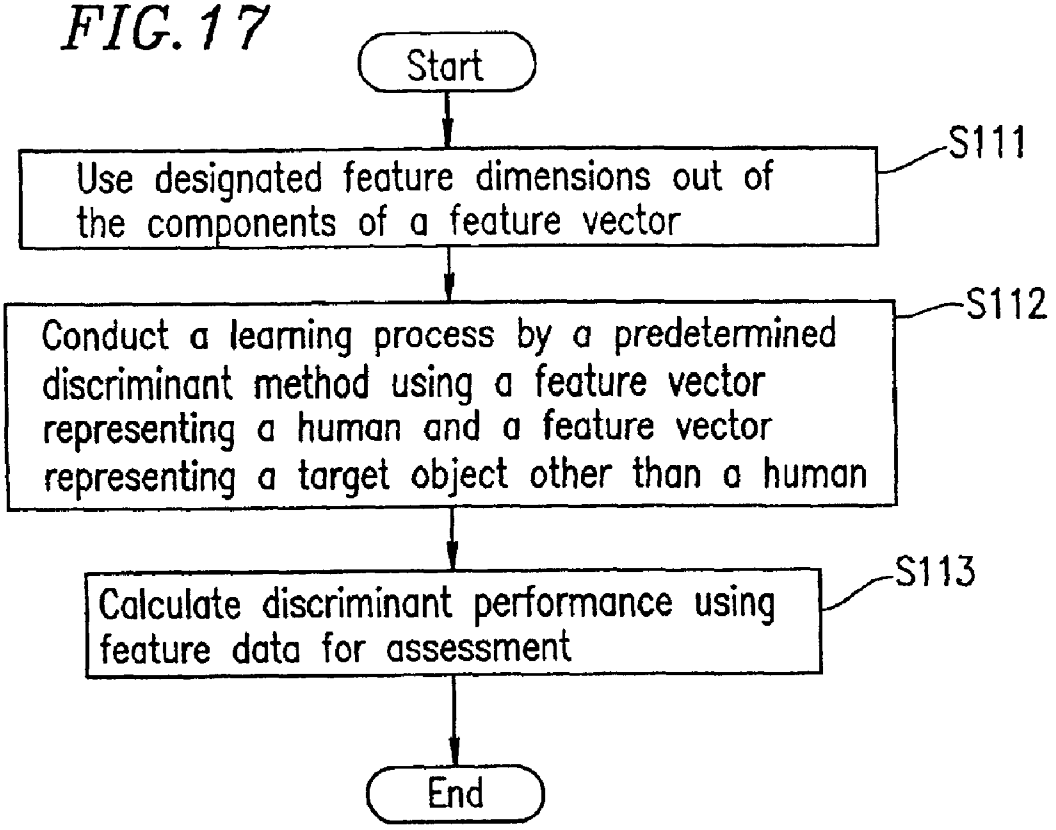
FIG. 17 is a flowchart showing a procedure for assessing discriminant performance in step S95 (FIG. 12).

FIG. 17 is a flowchart showing a procedure for assessing the discriminant performance in step S95 (FIG. 12).

In step S111, out of the components of a feature vector, only a component(s) corresponding to a feature dimension(s) designated in step S92 (FIG. 12) is made valid. As this feature vector, all feature vectors in the feature data F obtained in step S91 (FIG. 12) or part of the feature vectors may be used.

In step S112, a learning process for discriminating feature vectors representing humans and feature vectors representing target objects other than a human is conducted using a predetermined discriminant technique.

In step S113, feature data for assessment (a set of feature vectors) is used to calculate discriminant performance. The feature data F obtained in step S91 (FIG. 12) may be used as the feature data for assessment. Feature data which is not used in the learning process shown in FIG. 12 may be used. Alternatively, a set of feature vectors for assessment may be prepared in advance in a manner similar to that for the feature data F. Discriminant performance is, for example, represented by a rate at which a feature vector having components corresponding to dimensions made valid in step S94 (including a feature vector representing a human and a feature vector representing a target object other than a human) can be correctly discriminated using a discriminant technique after the learning process in step S112.

<Recognition Process>

Figure 18:
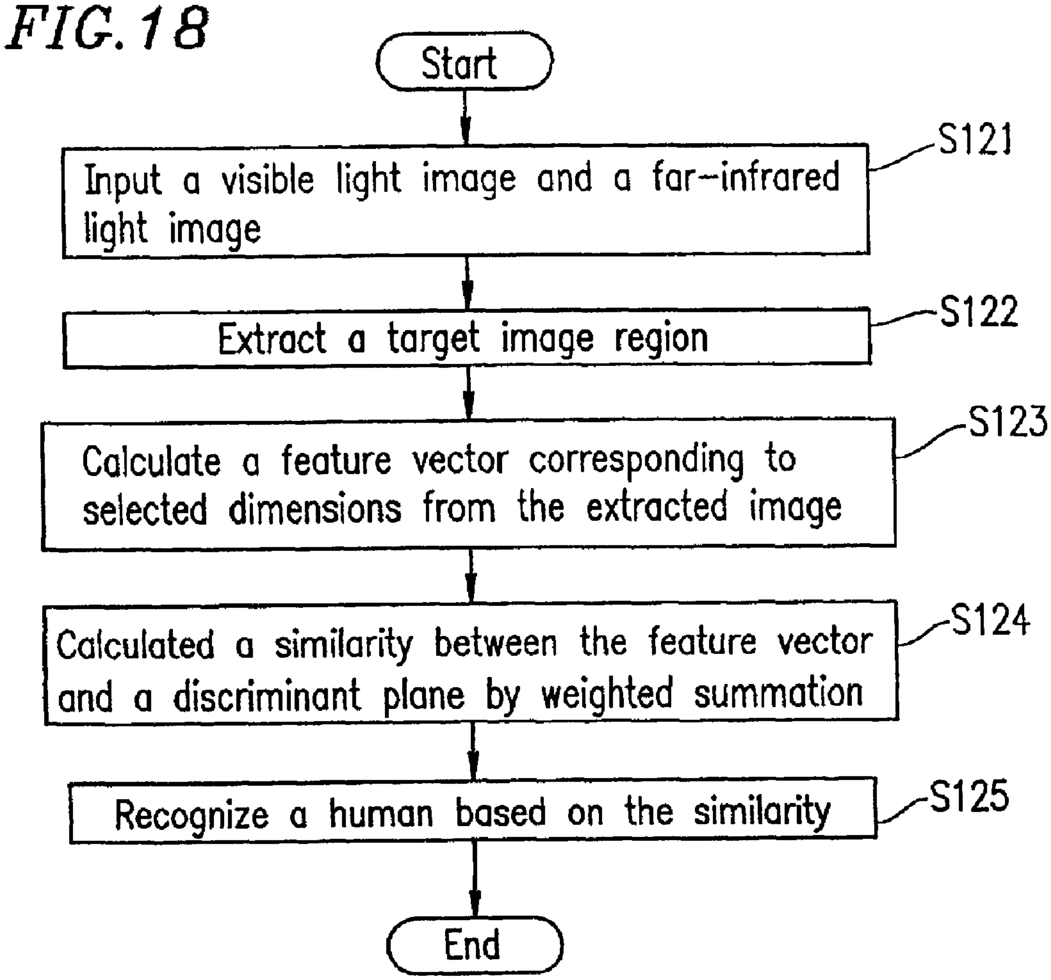
FIG. 18 is a flowchart showing the details of a recognition process executed by the object recognition apparatus 1.

FIG. 18 is a flowchart showing the details of a recognition process executed by the object recognition apparatus 1 of the present invention. Step S121 corresponds to step **S1002*a* (FIG. 1), steps S122 to S123 correspond to step S1002*b* (FIG. 1), and steps S124 to S125 correspond to step S1002*c* (FIG. 1**).

In step S121, a visible light image and a far-infrared light image are input. The input of images is conducted using the visible light camera 110 and the far-infrared light camera 100 (FIG. 6) in a manner similar to step S101 (FIG. 15) in the learning process.

In step S122, a target region to be recognized is extracted from an image (a visible light image and a far-infrared light image). The target region to be recognized is in the same shape as that of the image used in the learning process. The target region to be recognized may be fixed in the image. Alternatively, a plurality of target region to be recognized may be extracted from an image. A shape of the target region to be recognized is a rectangle having a size of H×W in the example described with reference to FIG. 16. As long as the shape of the target region to be recognized extracted from a visible light image in the recognition process is the same as the shape of a visible light image in the learning process, and the shape of the target region to be recognized extracted from a far-infrared light image in the recognition process is the same as the shape of a far-infrared light image in the learning process, the shape of the target region to be recognized extracted from a visible light image may be different from the target region to be recognized extracted from a far-infrared light image.

The extraction in step S122 is conducted by taking into consideration the positions of the visible light camera 110 and the far-infrared light camera 100 capturing a visible light image and a far-infrared light image input in the learning process in step S101 (FIG. 15). Specifically, the extraction in step S122 is conducted so that a target object is present at the same position between a visible light image in the learning process and the target region to be recognized extracted from a visible light image in the recognition process. The visible light camera 110 may be fixed at a position such that the obtained visible light image does not require the extraction in the recognition process. The same applies to a far-infrared light image. A visible light image and a far-infrared light image may be enlarged at different ratios. In this case, the enlargement ratios (the number of pixels) for a visible light image and a far-infrared light image may be different from each other, but the ratio of the enlargement ratio for a visible light image to the enlargement ratio for a far-infrared light image is regulated so as to be substantially the same between the learning process and the recognition process.

Then, if necessary, the sizes of the extracted visible light image and far-infrared light image are normalized. When the extracted visible light image and far-infrared light image have both a shape of a rectangle having a length-to-width ratio of 2:1, the images are normalized into a rectangle having, for example, 64 pixels×32 pixels. The normalization of the image size allows the size of a Gabor filter applied to the image in subsequent step S123 (the size of a specified region to which a filter is applied) to be fixed. The extracted visible light image and far-infrared light image whose sizes are normalized constitute an image set to be recognized.

In step S123, a feature vector corresponding to selected dimensions determined in step S97 (FIG. 12) is obtained from the extracted image. The feature vector is calculated using the same Gabor filter as used in the learning process. In the above-described step S122, when the size of an image is not normalized, a Gabor filter having a size corresponding to the image is used.

In the learning process, when part of the feature dimensions are removed, a Gabor filter does not have to be calculated for are moved feature dimension(s). The removed feature dimension(s) is removed from the calculation of the feature vector in advance.

In step S124, the weighted summation of a feature vector and the coefficients of a discriminant plane are used to calculated the similarity, which represents a level of a target object in an image set to be recognized being similar to a human. As described above, the weighted summation of a feature vector and the coefficients of a discriminant plane represents a distance between the feature vector and the discriminant plane (positional relationship). The distance is positive in a side of the feature space separated by the discriminant plane (e.g., at a first side on which a feature vector representing a human is present), and is negative in the other side of the feature space (e.g., at a second side on which a feature vector representing a target object other than a human is present). The absolute value of a distance is increased as a feature vector departs from the discriminant plane.

In step S125, a human is recognized based on the similarity (i.e., a target object is judged to be a human). For example, whether or not a target object is a human is judged based on whether the similarity (the distance between a feature vector and a discriminant plane) is positive or negative (i.e., which side of the discriminant plane the feature vector is present). Alternatively, a target object may be judged to be a human when the similarity is positive and the similarity exceeds a predetermined threshold. Such a threshold may be determined depending on a demand for recognition precision (e.g., it may be desired to reduce the possibility that a target object which is not a human is incorrectly recognized as a human, or it may be desired to reduce the possibility that a human is incorrectly recognized as not being a human). A numerical value indicating the similarity may be displayed on the display section 170.

As described above, the object recognition apparatus 1 (FIG. 6) of the present invention calculates discriminant parameters (e.g., parameters representing a discriminant plane) using a far-infrared light image and a visible light image in an image set to be learned, and recognizes a target object in a far-infrared light image and a visible light image in an image set to be recognized using the discriminant parameters as a criterion (e.g., determines whether or not the target object is categorized into a specific category). The recognition of a target object is conducted based on the intensity (first attribute) of visible light emitted or reflected from the target object and the intensity (second attribute) of far-infrared light emitted or reflected from the target object, thereby improving the reliability of the recognition of a target object.

The inventors of the present invention conducted a simulation of a learning process and a recognition process using image sets of visible light images and far-infrared light images captured outdoors during the day and night (858 image sets representing a human and 11052 image sets of a target object other than a human) as image sets to be learned. As a result of the simulation, the erroneous recognition rate was 0.2%. This erroneous recognition rate is significantly lowered (by a factor of 10 or more) compared to an erroneous detection rate (2.7%) obtained in a comparative example where a learning process and a recognition process were conducted using only visible light images and an erroneous recognition rate (3.5%) obtained in another comparative example where a learning process and a recognition process were conducted using only far-infrared light images. Thus, a high level of reliability of target object recognition can be achieved.

The object recognition apparatus 1 of the present invention can learn a correlation between a visible light image and a far-infrared light image by conducting a learning process using a visible light image and a far-infrared light image. Such a correlation plays a role in a recognition process. For example, it is assumed that a visible light image and a far-infrared light image are obtained by capturing an image of a target object (human) outdoors during day time hours. Under an environmental condition that a target object is directly irradiated by sunlight, the target object in the visible light image has a high level of luminance and the far-infrared light image indicates a high temperature of the target object. Conversely, under an environmental condition that a target object is not directly irradiated by sunlight, the target object in the visible light image has a low level of luminance and the far-infrared light image indicates a low temperature of the target object.

Since a visible light image and a far-infrared light image captured under various environmental conditions are used, the object recognition apparatus 1 of the present invention can learn a correlation between the visible light image and the far-infrared light image. As a result, for example, when a target object in a visible light image of a recognition image set has a high level of luminance and a far-infrared light image indicates a low temperature of the target object (a case which does not occur when a target object is a human), the possibility that the target object is incorrectly recognized as a human is low.

In a recognition system for conducting a learning process and a recognition process using only a visible light image, a learning process is conducted using a visible light image captured under various environmental conditions, thereby expanding a tolerable range in which a target object is recognized as a human. As a result, the possibility that a target object which is not a human is incorrectly recognized as a human is increased. The same applied to a recognition system in which a learning process and a recognition process are conducted using only a far-infrared light image.

The object recognition apparatus 1 of the present invention conducts a learning process using a set of images to be learned which are captured under various environmental conditions (e.g., an illumination condition and a temperature condition), thereby making it possible to recognize a target object in the image set to be recognized which are captured under various environmental conditions. Such a characteristic feature of the present invention is particularly suitable for an application in which a target object needs to be recognized under fluctuating environmental conditions, such as a surveillance system against outdoor intruders; a system for detecting a pedestrian, the apparatus being carried in a vehicle, such as an automobile; a vision system incorporated into a mobile robot; and the like.

Further, the above-described learning and recognition processes of the present invention are not specialized to an attribute of a target object. In other words, the object recognition apparatus 1 of the present invention can be applied to recognition of a target object other than a human (e.g., an animal recognition application or a vehicle recognition application) without modifying the learning and recognition processes of the present invention. Thus, in the object recognition apparatus 1 of the present invention, it is easy to modify the initial settings when environmental conditions under which recognition is conducted are changed or when a target object to be recognized is changed.

In the object recognition apparatus 1 of the present invention, it is not necessary to extract a specific temperature region from a far-infrared light image. Therefore, it is not necessary to perform calibration to compensate for an influence of the temperature of the optical system, circuits, and elements of a far-infrared light camera which changes over time. Therefore, the configuration and maintenance of the object recognition apparatus 1 can be advantageously simplified.

In the above-described examples of the present invention, a set of selected dimensions are determined in the learning process in step S97 (FIG. 12). Alternatively, a plurality of sets of selected dimensions may be prepared, and discriminant parameters are determined for each set. In this case, in the recognition process, recognition of a human may be conducted based on the similarity calculated using the discriminant parameters of any one of the sets. The human recognition may be conducted based on the sum (average) of similarities calculated using discriminant parameters of a plurality of sets. Alternatively, the human recognition may be conducted based on the similarity calculated using discriminant parameters of a plurality of sets and a decision of the recognition results may be made based on a majority rule.

In the above-described examples, a target region to be recognized is extracted in step S122, and a Gabor filter is applied to the region to calculate a feature vector in step S123. Alternatively, a Gabor filter may be applied to an image before the extraction. In this case, a specified region to which a filter is applied is provided over an entire image in advance and thereafter, a Gabor filter is applied to each region to obtain a filter output value for each position of the entire image. Thereafter, a feature vector is calculated using a filter output value only at a position of a region to be detected in an image. Since a filter output value is thus calculated in advance, when the extraction and recognition procedures are repeated while scanning an image extensively, it is possible to avoid a redundant situation that a plurality of filter calculations, in which the same Gabor filter is applied to the same position in an image, are conducted. Note that when the extraction and recognition procedures are repeated while scanning an image extensively, a human can be detected from an image in which a position of a target object is unknown. When such a process is conducted, the object recognition apparatus 1 (FIG. 6) can function as an object detection apparatus.

An image set representing a target object other than a human (including a visible light image and a far-infrared light image), which is used in a learning process, may be input to the object recognition apparatus 1 by capturing an existing target object other than a human, such as a tree and a dog. Alternatively, a set of a visible light image and a far-infrared light image generated by subjecting an image set representing a human which includes a visible light image and a far-infrared light image to a transformation, may be used in a learning process as an image set representing a target object other than a human. Examples of such transformation include a process for subjecting an image to an affine transformation and a process for adding noise to an image. A transformed image may be relatively similar to an image representing a human. When such a converted image is used in a learning process, a criterion with which a target object which is even slightly different in shape from a human is not recognized as a human can be learned.

In the above-described examples, a visible light image and a far-infrared light image which are captured substantially at the same time are combined to conduct learning and recognition processes. The number of combined images is not limited to two. A color image may be used as a visible light image instead of a luminance image. In this case, when a color image is represented by red (R), green (G), and blue (B) images (representing intensities in three different wavelength bands emitted or reflected from a target object), four images, i.e., the three R, G, and B images and one far-infrared light image, are input to the object recognition apparatus 1 as an image set (an image set to be learned and an image set to be recognized). When four images are input, the learning and recognition processes are similar to those when two images, i.e., a visible light image and a far-infrared light image are input.

An image set input to the object recognition apparatus 1 may include images captured at different times. For example, the input section 190 maybe configured to input four images, i.e., a visible light image (first image) and a far-infrared light image (second image) captured at time T (first time), and a visible light image (fifth image) and a far-infrared light image (sixth image) captured at time T+t (a predetermined time after the first time), as an image set to be recognized, into the object recognition apparatus 1. In this case, a set of images to be learned have to include a visible light image and a far-infrared light image captured at the same time and a visible light image and a far-infrared light image captured at a time t after this time. When four images are input, the learning and recognition processes are similar to those when two images, i.e., a visible light image and a far-infrared light image are input.

As described above, when visible light images and far-infrared light images captured at different times are combined, a target object having a shape varying over time in a specific manner, such as a pedestrian, and a target object having a shape which does not vary over time can be discriminated, thereby improving the precision of the recognition.

When the predetermined time t is short, a target object having a fast motion can be efficiently recognized. When the predetermined time t is long, a target object having a slow motion can be efficiently recognized. Typically, when recognizing a human, a vehicle, or an animal moving in an outdoor environment, a predetermined time t is set to one second or less, whereby a target object having a shape and/or a position varying over time can be efficiently recognized. As described above, information on images at a plurality of times are effectively combined, thereby improving the discriminant performance.

According to the object recognition apparatus 1 of the present invention, even when the number of images included in an image set is increased, a feature dimension (filter output value) which contributes to discrimination can be selected, thereby suppressing an increase in the amount of calculation in a recognition process due to an increase in the number of images.

An image set input to the object recognition apparatus 1 may include images captured at different view points. For example, a visible light image and a far-infrared light image captured at the same position, and a visible light image and a far-infrared light image captured at a position different from that point may constitute an image set.

Figure 19:
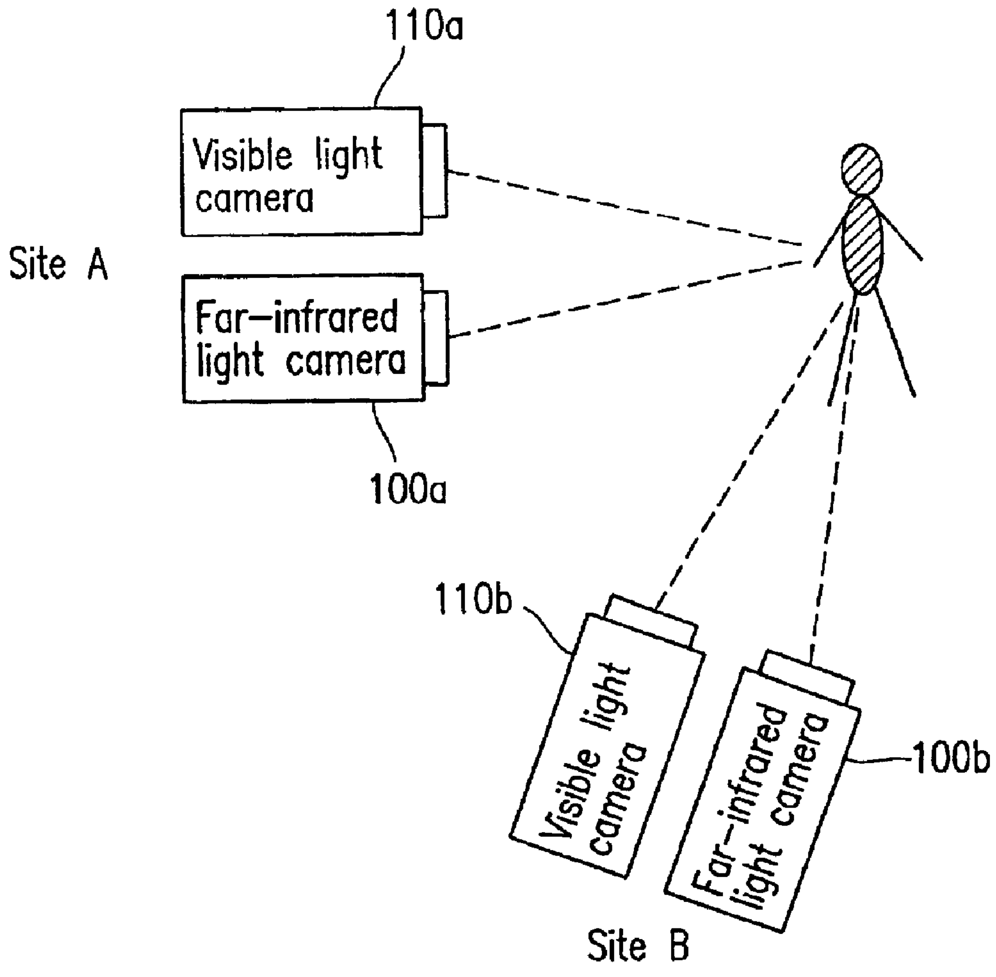
FIG. 19 is a diagram showing another exemplary arrangement of a far-infrared light camera and a visible light camera.

FIG. 19 is a diagram showing another exemplary arrangement of a far-infrared light camera and a visible light camera. In FIG. 19, a far-infrared light camera 100*a* and a visible light camera 110*a* are arranged at site A while a far-infrared light camera 100*b* and a visible light camera 110*b* are arranged at site B. The four cameras are arranged in such a manner as to capture an image of the same target object. The far-infrared light cameras 100*a* and 100*b* and the visible light cameras 110*a* and 100*b* collectively function as the input section 190 (FIG. 6), which input an image set to be learned and an image set to be recognized into the object recognition apparatus 1 (FIG. 6).

The input section 190 is configured so that in a recognition process, four images, i.e., a visible light image (first image) and a far-infrared light image (second image) captured at site A (first site) as well as a visible light image (fifth image) and a far-infrared light image (sixth image) captured at site B (second site), are input as an image set to be recognized into the object recognition apparatus 1. When four images are input, the learning and recognition processes are similar to those when two images, i.e., a visible light image and a far-infrared light image are input.

As described above, visible light images and far-infrared light images captured at different sites are combined. Therefore, an object having different shapes depending on view points, such a human, can be more precisely recognized.

According to the object recognition apparatus 1 of the present invention, even when the number of images in an image set is increased, only a feature dimension (filter output value) which contributes to discrimination is selected, thereby suppressing an increase in the amount of calculation in a recognition process due to an increase in the number of images.

Further, a visible light image and a far-infrared light image captured at different positions may constitute an image set.

Figure 20:
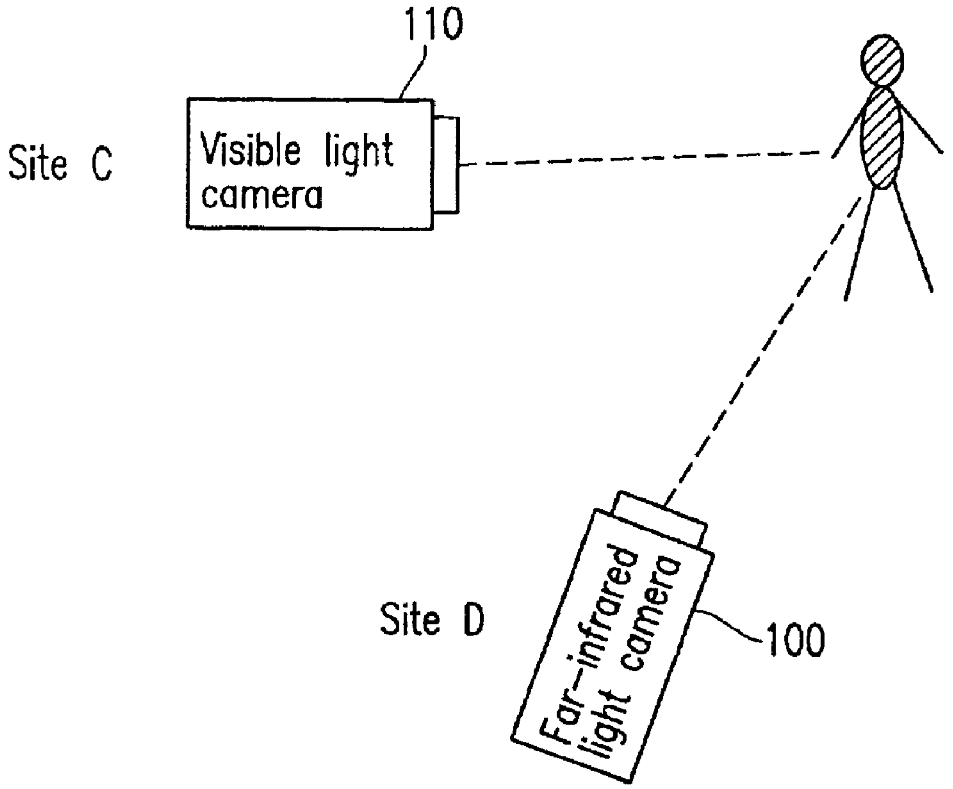
FIG. 20 is a diagram showing yet another exemplary arrangement of a far-infrared light camera 100 and a visible light camera 110.

FIG. 20 is a diagram showing yet another exemplary arrangement of a far-infrared light camera 100 and a visible light camera 110. In FIG. 20, the visible light camera 110 is placed at site C while the far-infrared light camera 100 is placed at site D. The two cameras are provided to capture an image of the same target object.

In FIG. 20, the far-infrared light camera 100 and the visible light camera 110 are configured to capture a visible light image (first image) from site C (first site) and a far-infrared light image (second image) from site D (second site). With such a configuration, the background of a target object may be different between a visible light image and a far-infrared light image. Therefore, the possibility that unnecessary information on the background shared by the visible light image and the far-infrared light image has an adverse influence on a result of recognition is lowered, whereby the recognition result is not easily affected by the background. Further, similar to the example shown in FIG. 19, when images captured from a plurality of view points are used, an object having different shapes depending on view points, such a human, can be more precisely recognized.

In the above-described examples, a visible light image and a far-infrared light image are used as images representing a target object using different attributes, but the present invention is not limited to this. An image set may include a visible light image and a near-infrared image, or a visible light image and a ultraviolet light image. Alternatively, an image set may include a visible light image and a range image, in which pixel values indicate distances between a target object and a camera site. In other words, a range image represents a target object using an attribute which is a distance between a camera site and the target object.

The above-described learning and recognition processes of the present invention are not specialized to an attribute of a target object. Therefore, when images of types other than a visible light image and a far-infrared light image are used, the learning and recognition processes of the present invention do not have to be modified.

The learning and recognition processes of the present invention are typically executed by software on a computer. The learning and recognition processes of the present invention may be achieved by hardware or a combination of software and hardware. Further, it is not essential for the object recognition apparatus 1 (FIG. 6) to execute a learning process. This is because the object recognition apparatus 1 can execute a recognition process (steps S1002*a* to S1002*c* shown in FIG. 1) as long as a result(s) of a learning process (discriminant parameters) is stored in the discriminant parameter storage section 150. Such discriminant parameters may be predetermined parameters. Alternatively, such discriminant parameters may be calculated by executing a learning process using an apparatus other than the object recognition apparatus 1. When discriminant parameters obtained as a result of such a learning process are stored in the discriminant parameter storage section 150 of the object recognition apparatus 1, the object recognition apparatus 1 can execute a recognition process using the discriminant parameters as a criterion.

When the object recognition apparatus 1 does not execute a learning process, the learning section 130 and the storage apparatus 120 may be omitted.

A program representing one or both of the learning process and the recognition process of the present invention (a learning program, and a recognition program) may be stored in a memory (not shown) in the learning section 130 or the recognition section 140. Alternatively, such a program may be recorded in any type of computer readable recording medium, such as, a flexible disk, a CD-ROM, and a DVD-ROM. A learning program or a recognition program recorded in such a recording medium is loaded via a disk drive (not shown) to a memory in a computer. Alternatively, a learning program or a recognition program (or a part thereof) may be loaded via a communication network or broadcast to a memory in a computer. A learning or recognition program is executed by a CPU included in a computer, thereby causing the computer to function as an object recognition apparatus.

According to the present invention, an input image set to be recognized includes a first image representing a target object using a first attribute and a second image representing the target object using a second attribute different from the first attribute. Whether or not a target object is categorized into a specific category is judged based on the first attribute and the second attribute, whereby the reliability of the recognition of a target object can be improved. Further, a predetermined image filter is applied to a predetermined number of positions in an image to calculate a filter output value and a feature vector in the feature space having a filter output value as a component, whereby an image set can be represented by the feature vector. In this process, the matching between a region in the first image and a region in the second image is not required, whereby it is easy to provide the initial settings of the recognition of a target object and a result of the recognition is not easily affected by environmental conditions.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An object recognition apparatus, comprising:

an input section for inputting a first image set including a predetermined number of images including a first image representing a first target object using a first attribute and a second image representing the first target object using a second attribute different from the first attribute, wherein the predetermined number is two or more;

a feature vector calculation section for calculating a first feature vector in a feature space having at least one filter output value as a vector component, the at least one filter output value being obtained by applying at least one predetermined image filter to at least one predetermined position in the predetermined number of images in the first image set; and a judgment section for judging whether or not the first target object is categorized into a specific category based on a relationship between the first feature vector and predetermined discriminant parameters, wherein the at least one predetermined image filter has directional selectivity, positional selectivity, and spatial frequency selectivity.

2. An object recognition apparatus according to claim 1, wherein:

the input section further inputs a plurality of image sets each including the images of the predetermined number, the plurality of image sets including at least one second image set and at least one third image set other than the at least one second image set, each image of the at least one second image set including a third image representing a second target object belonging to the specific category using the first attribute and a fourth image representing the second target object using the second attribute;

the feature vector calculation section further calculates a feature vector in a feature space having at least one filter output value as a vector component, the at least one filter output value being obtained by applying at least one predetermined image filter to at least one predetermined position in the predetermined number of images in the said input plurality of image sets; and the object recognition apparatus further includes a learning section for calculating the discriminant parameters so as to discriminate at least one feature vector in the feature space for the at least one second image set from at least one feature vector in the feature space for the at least one third image set.

3. An object recognition apparatus according to claim 2, wherein the learning section defines the feature space by removing at least one dimension from a temporary feature space having a higher number of dimensions than the feature space based on a direction of a normal to a plane for discriminating the at least one feature vector for the at least one second image set from the at least one feature vector for the at least one third image set.

4. An object recognition apparatus according to claim 1, wherein:

the discriminant parameters represent a discriminant surface in the feature space; and the judgment section judges whether or not the first target object is categorized into the specific category based on which side of the discriminant surface the first feature vector is present.

5. An object recognition apparatus according to claim 4, wherein the judgment section judges that the first target object is categorized into the specific category when a distance between the first feature vector and the discriminant surface is greater than or equal to a predetermined threshold.

6. An object recognition apparatus according to claim 1, wherein the first image represents an intensity of light having a first wavelength band emitted or reflected by the first target object, and the second image represents an intensity of light having a second wavelength band different from the first wavelength band emitted or reflected by the first target object.

7. An object recognition apparatus according to claim 1, wherein the input section further inputs a fifth image representing the first target object using the first attribute and a sixth image representing the first target object using the second attribute, and the input section is configured so that the first image and the second image are captured at a first time, and the fifth image and the sixth image are captured a predetermined time after the first time.

8. An object recognition apparatus according to claim 1, wherein the input section is configured so that the first image is captured at a first site, and the second image is captured at a second site different from the first site.

9. An object recognition apparatus according to claim 1, wherein the input section further inputs a fifth image representing the first target object using the first attribute and a sixth image representing the first target object using the second attribute, and the input section is configured so that the first and second images are captured at a first site, and the fifth and sixth images are captured at a second site different from the first site.

10. An object recognition method, comprising the steps of:

(a) inputting a first image set including a predetermined number of images including a first image representing a first target object using a first attribute and a second image representing the first target object using a second attribute different from the first attribute, wherein the predetermined number is two or more;

(b) calculating a first feature vector in a feature space having at least one filter output value as a vector component, the at least one filter output value being obtained by applying at least one predetermined image filter to at least one predetermined position in the predetermined number of images in the first image set; and (c) judging whether or not the first target object is categorized into a specific category based on a relationship between the first feature vector and predetermined discriminant parameters, wherein at least one predetermined image filter has directional selectivity, positional selectivity, and spatial frequency selectivity.

11. A computer-readable recording medium storing a program for causing a computer to perform an object recognition process, the process comprising the steps of:

(a) inputting a first image set including a predetermined number of images including a first image representing a first target object using a first attribute and a second image representing the first target object using a second attribute different from the first attribute, wherein the predetermined number is two or more;

(b) calculating a first feature vector in a feature space having at least one filter output value as a vector component, the at least one filter output value being obtained by applying at least one predetermined image filter to at least one predetermined position in the predetermined number of images in the first image; and (c) judging whether or not the first target object is categorized into a specific category based on a relationship between the first feature vector and predetermined discriminant parameters, wherein at least one predetermined image filter has directional selectivity, positional selectivity, and spatial frequency selectivity.

* * * * *